US012684562B2

(12) United States Patent
Zhang et al.

(10) Patent No.: US 12,684,562 B2
(45) Date of Patent: Jul. 14, 2026

(54) UPLINK SIGNAL TRANSMISSION METHOD AND DEVICE, COMMUNICATION NODE AND STORAGE MEDIUM

(71) Applicant: ZTE CORPORATION, Shenzhen (CN)

(72) Inventors: Chenchen Zhang, Shenzhen (CN); Yu Ngok Li, Shenzhen (CN); Chuangxin Jiang, Shenzhen (CN); Xingguang Wei, Shenzhen (CN); Peng Hao, Shenzhen (CN)

(73) Assignee: ZTE CORPORATION, Shenzhen (CN)

( * ) Notice: Subject to any disclaimer, the term of this patent is extended or adjusted under 35 U.S.C. 154(b) by 906 days.

(21) Appl. No.: 17/926,743

(22) PCT Filed: May 19, 2021

(86) PCT No.: PCT/CN2021/094499
§ 371 (c)(1),
(2) Date: Nov. 21, 2022

(87) PCT Pub. No.: WO2021/233323
PCT Pub. Date: Nov. 25, 2021

(65) Prior Publication Data
US 2023/0284213 A1 Sep. 7, 2023

(30) Foreign Application Priority Data
May 20, 2020 (CN) .......................... 202010432184.4

(51) Int. Cl.
*H04L 5/00* (2006.01)
*H04W 72/1268* (2023.01)
*H04W 72/23* (2023.01)

(52) U.S. Cl.
CPC ....... *H04W 72/1268* (2013.01); *H04L 5/0051* (2013.01); *H04W 72/23* (2023.01)

(58) Field of Classification Search
CPC .. H04W 72/1268; H04W 72/23; H04L 5/0051
(Continued)

(56) References Cited

U.S. PATENT DOCUMENTS

2019/0141731 A1* 5/2019 Yoshimoto ............ H04W 72/12
2020/0053724 A1* 2/2020 MolavianJazi ....... H04L 5/0048

FOREIGN PATENT DOCUMENTS

CN 102917460 A 2/2013
CN 105376812 A 3/2016
(Continued)

OTHER PUBLICATIONS

Partial Supplementary European Search Report in Application No. 21807673.5, dated May 22, 2024, 10 pages.
(Continued)

*Primary Examiner* — Christopher R Crompton
(74) *Attorney, Agent, or Firm* — Morgan, Lewis & Bockius LLP

(57) ABSTRACT

Provided are an uplink signal transmission method and device, a communication node and a storage medium. The method includes determining a transmission mechanism of an uplink signal according to uplink configuration information and transmitting the uplink signal on a target resource according to the transmission mechanism.

20 Claims, 3 Drawing Sheets

Determine a transmission mechanism of an uplink signal according to uplink configuration information ⟶ 110

Transmit the uplink signal on a target resource according to the transmission mechanism ⟶ 120

(58) Field of Classification Search
USPC ......................................................... 370/329
See application file for complete search history.

(56)                     References Cited

FOREIGN PATENT DOCUMENTS

| CN | 109495879 A | 3/2019 |
|----|-------------|--------|
| CN | 109600208 A | 4/2019 |
| CN | 109802799 A | 5/2019 |
| CN | 110071749 A | 7/2019 |
| CN | 111093279 A | 5/2020 |
| CN | 111901878 A | 11/2020 |
| JP | 2019037006 A | 3/2019 |
| JP | 2019103057 A | 6/2019 |
| WO | WO 2019/066560 A1 | 4/2019 |
| WO | WO2020001517 A1 | 1/2020 |

OTHER PUBLICATIONS

International Search Report in Application No. PCT/CN2021/094499, dated Aug. 2, 2021, 4 pages including English translation.
First Chinese Search Report in Application No. 2020104321844, dated Aug. 13, 2024, 8 pages, including translation.
First Chinese Office Action in Application No. 202010432184.4, dated Aug. 19, 2024, 16 pages, including translation.
ZTE Corporation, "Remaining Issues on Support of Tx Switching between Two Uplink Carriers", 3GPP TSG RAN WG1, Meeting #101-e, R1-2003332, e-Meeting, May 25-Jun. 5, 2020.

\* cited by examiner

UPLINK SIGNAL TRANSMISSION METHOD AND DEVICE, COMMUNICATION NODE AND STORAGE MEDIUM

CROSS-REFERENCE TO RELATED APPLICATIONS

This is a National Stage Application filed under 35 U.S.C. 371 based on International Patent Application No. PCT/CN2021/094499, filed on May 19, 2021, which claims priority to Chinese Patent Application No. 202010432184.4 filed with the China National Intellectual Property Administration (CNIPA) on May 20, 2020, the disclosures of which are incorporated herein by reference in their entireties.

TECHNICAL FIELD

The present application relates to wireless communication networks, for example, an uplink signal transmission method and device, a communication node and a storage medium.

BACKGROUND

In a wireless communication network, a serving node may configure at least one resource for a terminal, and then the terminal may perform antenna selection and transmit an uplink signal. In this manner, comprehensive downlink channel information is obtained according to channel reciprocity. In a carrier aggregation (CA) scenario or a dual connectivity (DC) scenario, a terminal supports transmitting or receiving signals on multiple serving cells. However, due to the limitation of the number of uplink transmit resources, limited uplink transmit resources cannot be reasonably allocated to different serving cells. In the case where for a terminal, the number of serving cells supporting physical uplink shared channel (PUSCH) transmission or physical uplink control channel (PUCCH) transmission is less than the number of serving cells supporting physical downlink shared channel (PDSCH) reception or physical downlink control channel (PDCCH) reception, there is also a lack of an effective mechanism to ensure that uplink signals can be fully and effectively transmitted in complex cases such as different serving cells, different resources and different numbers of antennas, and the reliability of uplink signal transmission is low. As a result, a serving node cannot obtain comprehensive downlink channel information of all serving cells supporting PDSCH transmission or PDCCH transmission.

SUMMARY

The present application provides an uplink signal transmission method and device, a communication node and a storage medium to improve the reliability of uplink signal transmission.

An embodiment of the present application provides an uplink signal transmission method. The method includes determining a transmission mechanism of an uplink signal according to uplink configuration information and transmitting the uplink signal on a target resource according to the transmission mechanism.

An embodiment of the present application provides an uplink signal transmission device. The device includes a mechanism determination module and a transmission module. The mechanism determination module is configured to determine a transmission mechanism of an uplink signal according to uplink configuration information. The transmission module is configured to transmit the uplink signal on a target resource according to the transmission mechanism.

An embodiment of the present application provides a communication node. The communication node includes one or more processors and a storage device configured to store one or more programs. The one or more programs, when executed by the one or more processors, cause the one or more processors to perform the preceding uplink signal transmission method.

An embodiment of the present application provides a computer-readable storage medium. The computer-readable storage medium stores a computer program. The computer program, when executed by a processor, implements the preceding uplink signal transmission method.

DETAILED DESCRIPTION

Figure 1:
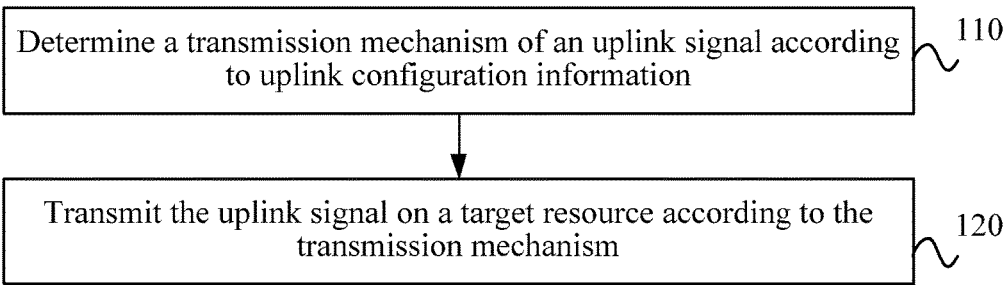
FIG. 1 is a flowchart of an uplink signal transmission method according to an embodiment.

The present application is described hereinafter in conjunction with drawings and embodiments. It is to be understood that the embodiments described herein are intended to illustrate the present application and not to limit the present application. For ease of description, only part, not all, of structures related to the present application are illustrated in the drawings.

In wireless communication networks, a serving node may configure one or more resources for a terminal, and then the terminal may perform antenna selection and transmit an uplink signal. In a CA scenario or a DC scenario, if the terminal supports transmitting or receiving signals on multiple serving cells, the serving node may also configure one or more serving cells for a terminal. However, due to the limitation of the number of uplink transmit resources, limited uplink transmit resources cannot be reasonably allocated to different serving cells. In the case where formats of pieces of downlink control information (DCI) for scheduling uplink transmission are different, pieces of information about the number of ports are different and for a terminal, the number of serving cells supporting PUSCH transmission or PUCCH transmission is less than the number of serving cells supporting PDSCH reception or PDCCH reception, there is also a lack of an effective mechanism to ensure that uplink signals can be fully and effectively transmitted in complex cases of different uplink configuration information (for example, the serving node configures one or more serving cells and different resources for a terminal, and the number of uplink transmit resources supported by the terminal is limited). As a result, the reliability of uplink signal transmission is low.

An embodiment of the present application provides an uplink signal transmission method to improve the reliability of uplink signal transmission in the case of different uplink configuration information, thereby fully utilizing limited uplink transmit resources and obtaining more comprehensive channel information. FIG. 1 is a flowchart of an uplink signal transmission method according to an embodiment. As shown in FIG. 1, the method provided by this embodiment includes operations 110 and 120.

In operation 110, a transmission mechanism of an uplink signal is determined according to uplink configuration information.

In this embodiment, the uplink configuration information may be configured to reflect serving cells and different resources configured by a serving node for a terminal, the number of uplink transmit resources supported by the terminal, the allocation of uplink transmit resources between different serving cells or different resources, the format of DCI for scheduling uplink transmission and the number of ports supported by an uplink resource used for a codebook. The uplink configuration information affects the transmission mechanism of the uplink signal. The transmission mechanism may include how the terminal allocates uplink transmit resources between different serving cells or different resources, and how the terminal transmits uplink signals by using different target resources or different ports in different serving cells. Accordingly, the transmission mechanism may further include which target resources of which serving cells a serving node uses to receive uplink signals, and which format of DCI is used to schedule uplink transmission. According to the uplink configuration information, various cases of transmitting the uplink signal may be comprehensively considered, and the corresponding transmission mechanism is determined.

In operation 120, the uplink signal is transmitted on a target resource according to the transmission mechanism.

In this embodiment, in the case where uplink configuration information is different, transmission mechanisms of uplink signals may be different. The correspondence between uplink configuration information and the transmission mechanism to be adopted may be semi-statically configured by the serving node and indicated to the terminal or may be predefined by a system or a protocol. On this basis, it is ensured that for each serving cell that needs to transmit an uplink signal, the transmission of the uplink signal may be completed by using a target resource according to a certain transmission mechanism. The terminal or the serving node may implement the transmission and reception of the uplink signal according to the transmission mechanism respectively. The target resource refers to a resource configured to transmit the uplink signal in the serving cell that needs to transmit the uplink signal and is configured by the serving node for the terminal.

In the uplink signal transmission method of this embodiment, the transmission mechanism of the uplink signal is determined according to the uplink configuration information, and the uplink signal is transmitted on the configured target resource according to the transmission mechanism.

The terminal or the serving node may implement the transmission and reception of the uplink signal according to the transmission mechanism. In this manner, the reliability of the uplink signal transmission is improved. On this basis, the terminal may transmit uplink signals completely and comprehensively, so that the limited uplink transmit resources are fully utilized, and the serving node may acquire comprehensive downlink channel information.

In an embodiment, the uplink configuration information includes at least one of the following: antenna configuration information, uplink transmit resource allocation information, format information of DCI for scheduling uplink transmission, or information about the number of ports supported by an uplink resource used for a codebook.

In this embodiment, the uplink configuration information may include the antenna configuration information. The antenna configuration information reflects the signal transmit or reception capability of the terminal. For example, the antenna configuration information of the terminal may be expressed as xT yR. xT denotes that the terminal may use x antennas to transmit uplink signals. yR denotes that the terminal may use y antennas to perform downlink reception. x may be less than or equal to y. In the case where y is greater than x, the terminal may transmit the uplink signal in an antenna selection manner. In this manner, the serving node may know the channel information of each receive antenna from the serving node to the terminal through channel reciprocity. The uplink configuration information may also include the uplink transmit resource allocation information such as allocation information of transmit antennas on each serving cell and allocation of radio frequency chains on each serving cell. Uplink transmit resources may be allocated to different serving cells by the terminal respectively or may be all allocated to the same serving cell. When another serving cell needs to transmit an uplink signal, handover is performed. The uplink configuration information may also include the format information of the DCI. For example, the format of the DCI may be a first format (format 0_0) or a second format (a format other than format 0_0, for example, format 0_1 and format 0_2). The uplink configuration information may also be the information about the number of ports supported by the uplink resource used for the codebook. The number of ports supported by the uplink resource used for the codebook may be 1 or greater than 1. The uplink resources used for the codebook may be a sounding reference signal (SRS) resource used for the codebook or an SRS resource set used for the codebook.

In an embodiment, the uplink transmit resource allocation information includes at least one of the following: each serving cell is allocated one uplink transmit resource; a plurality of serving cells share one or more uplink transmit resources; or an uplink transmit resource is allocated to a serving cell having an uplink signal transmit demand in a set time period, and one or more serving cells having the uplink signal transmit demand exist.

In this embodiment, it may be necessary to transmit uplink signals on multiple serving cells. In the case where uplink transmit resources supported by the terminal are limited, the terminal needs to allocate the uplink transmit resources to multiple serving cells. Taking that the terminal supports two uplink transmit resources (radio frequency chains) as an example, if the serving node configures the terminal to transmit uplink signals on two or more serving cells, the terminal may operate in the following multiple cases of radio frequency chain allocation: one radio frequency chain is allocated to a first serving cell, and the other radio frequency chain is allocated to a second serving cell;

the two radio frequency chains are allocated to the same serving cell; and multiple serving cells share one radio frequency chain or share two radio frequency chains. If the two radio frequency chains are allocated to one serving cell, in the case where the other serving cell needs to send an uplink signal, it is necessary to hand over all or part of the allocated radio frequency chains to the other serving cell, and this process has a certain handover delay.

The number of radio frequency chains supported by the terminal is limited, which may also be reflected in that the maximum number of ports of uplink resources (such as SRS resources) supported by the terminal is limited. Accordingly, taking that the terminal supports two SRS ports as an example, if the serving node configures the terminal to transmit uplink signals on two or more serving cells, the terminal may use one SRS port to send an uplink signal on the first serving cell and may use the other SRS port to send an uplink signal on the other serving cell; or the terminal may use two SRS ports to send uplink signals on one serving cell and not perform uplink sending on the other serving cell; or multiple serving cells share one SRS port or two SRS ports.

In an embodiment, the serving cells include at least one of the following: a cell supporting PUSCH transmission or PUCCH transmission, a cell supporting SRS transmission or a cell supporting PDSCH reception or PDCCH reception.

In this embodiment, the serving node may configure one or more serving cells for the terminal. The configured serving cell may be the cell supporting the PUSCH transmission or the PUCCH transmission, the cell supporting the SRS transmission, the cell supporting the PDSCH reception or the PDCCH reception, or a cell supporting the PDSCH reception or the PDCCH reception but not supporting PUSCH sending or PUCCH sending.

In an embodiment, the transmission mechanism includes the following: for each serving cell allocated an uplink transmit resource, the terminal uses the allocated uplink transmit resource to transmit an uplink signal on a target resource according to the uplink configuration information. The uplink configuration information includes at least one of the following: antenna configuration information, format information of DCI for scheduling uplink transmission, or information about the number of ports supported by an uplink resource used for a codebook.

In this embodiment, for each serving cell allocated the uplink transmit resource, the determined transmission mechanism may be the following: the terminal uses the allocated uplink transmit resource to transmit the uplink signal on the target resource according to the antenna configuration information. For example, in the case of different xT yR, the same uplink transmit resource or different uplink transmit resources and the same target resource or different target resources may be configured for transmission of the uplink signal. The determined transmission mechanism may also be the following: the terminal uses the allocated uplink transmit resource to transmit the uplink signal on the target resource according to the format information of the DCI for scheduling uplink transmission. For example, for format 0_0 and a format other than format 0_0, the same uplink transmit resource or different uplink transmit resources and the same target resource or different target resources may be configured for transmission of the uplink signal. The determined transmission mechanism may also be the following: the terminal uses the allocated uplink transmit resource to transmit the uplink signal on the target resource according to the information about the number of ports supported by the uplink resource used for the codebook. For example, in the case where the number of ports supported by the uplink resource used for the codebook is equal to or greater than 1, the same uplink transmit resource or different uplink transmit resources and the same target resource or different target resources may be configured for transmission of the uplink signal.

In an embodiment, for each serving cell allocated the uplink transmit resource, the terminal uses the allocated uplink transmit resource to transmit the uplink signal on the target resource according to the uplink configuration information in one of the manners below.

(1) For each serving cell allocated the uplink transmit resource, the terminal uses the same uplink transmit resource to transmit uplink signals on different target resources. The uplink configuration information includes the antenna configuration information. The antenna configuration information includes that the number of receive antennas supported by the terminal is greater than the number of transmit antennas supported by the terminal. That is, the antenna configuration information is expressed as xT yR. In the case where y>x, the terminal may use the same uplink transmit resource (such as a radio frequency chain) to transmit the uplink signals on different target resources.

(2) For each serving cell allocated the uplink transmit resource, the terminal uses different uplink transmit resources to transmit uplink signals on different target resources separately. The uplink configuration information includes the antenna configuration information. The antenna configuration information includes that the number of receive antennas supported by the terminal is greater than the number of transmit antennas supported by the terminal. That is, the antenna configuration information is expressed as xT yR. In the case where y>x, the terminal may use different uplink transmit resources (such as radio frequency chains) to transmit the uplink signals on different target resources.

(3) For each serving cell allocated the uplink transmit resource, the terminal uses different uplink transmit resources to transmit uplink signals on different target resources separately. The uplink configuration information includes the antenna configuration information. The antenna configuration information includes that the number of receive antennas supported by the terminal is less than or equal to the number of transmit antennas supported by the terminal. That is, the antenna configuration information is expressed as xT yR. In the case where y<x, the terminal may use different uplink transmit resources (such as radio frequency chains) to transmit the uplink signals on different target resources.

(4) For each serving cell allocated the uplink transmit resource, the terminal uses the same uplink transmit resource to transmit uplink signals on different target resources. The uplink configuration information includes the format information of the DCI for scheduling the uplink transmission in the serving cell. The format information of the DCI for scheduling the uplink transmission in the serving cell includes that the format of the DCI is format 0_0. That is, if on the serving cell, the format of the DCI for scheduling the uplink transmission is format 0_0, the terminal may use the same uplink transmit resource (such as a radio frequency chain) to transmit the uplink signals on different target resources.

(5) For each serving cell allocated the uplink transmit resource, the terminal uses different uplink transmit resources to transmit uplink signals on different target resources separately. The uplink configuration information includes the format information of the DCI for scheduling the uplink transmission in the serving cell. The format information of the DCI for scheduling the uplink transmission in the serving cell includes that the format of the DCI is the format other than format 0_0. That is, if on the serving cell, the format of the DCI for scheduling the uplink transmission is the format other than format 0_0, the terminal may use different uplink transmit resources (such as radio frequency chains) to transmit the uplink signals on different target resources.

(6) For each serving cell allocated the uplink transmit resource, the terminal uses the same uplink transmit resource to transmit uplink signals on different target resources. The uplink configuration information includes the information about the number of ports supported by an uplink resource that is used for a codebook and configured on the serving cell. The information about the number of the ports supported by the uplink resource that is used for the codebook and configured on the serving cell includes that the number of the ports is 1. That is, on the serving cell, the number of ports supported by the SRS resource or the SRS resource set used for the codebook is 1, and then the terminal may use the same uplink transmit resource (such as a radio frequency chain) to transmit the uplink signals on different target resources.

(7) For each serving cell allocated the uplink transmit resource, the terminal uses different uplink transmit resources to transmit uplink signals on different target resources separately. The uplink configuration information includes the information about the number of ports supported by an uplink resource that is used for a codebook and configured on the serving cell. The information about the number of the ports supported by the uplink resource that is used for the codebook and configured on the serving cell includes that the number of the ports is greater than or equal to 2. That is, on the serving cell, the number of the ports supported by the SRS resource or the SRS resource set used for the codebook is greater than or equal to 2, and then the terminal may use different uplink transmit resources (such as radio frequency chains) to transmit the uplink signals on different target resources.

According to the method of the preceding embodiment, in the complex case of different uplink configuration information, flexibility of the transmission mechanism is improved, reliability of uplink signal transmission is further improved, and it is ensured that the serving node can comprehensively receive the uplink signals and acquire comprehensive downlink channel information.

The transmission mechanism (for each serving cell allocated the uplink transmit resource, the terminal uses the allocated uplink transmit resource to transmit the uplink signal on the target resource according to the uplink configuration information) is described below through example one.

Example One

For a terminal, the antenna configuration information of the terminal on a first band is expressed as 1T xR, and x denotes any value of {1, 2, 4, 8, 16, 32, 64, 128}. A serving node configures one or more serving cell for the terminal. The serving node configures SRS resources or SRS resource sets used for antenna selection on at least two serving cells for the terminal. The at least two serving cells include serving cell 1 (that is, a first serving cell) and serving cell 2 (that is, a second serving cell). Serving cell 1 is on the first band. Serving cell 2 may be on the first band or a second band. The antenna configuration supported by the terminal on the second band and the antenna configuration supported by the terminal on the first band may be the same or different. The terminal supports two radio frequency chains. The terminal may determine how to allocate the two radio frequency chains to serving cell 1 and serving cell 2 according to system predefinition or semi-static configuration of the serving node. For example, the uplink transmit resource allocation information is that the terminal uses radio frequency chain 1 to send an SRS on serving cell 1 and uses radio frequency chain 2 to send an SRS on serving cell 2.

Figure 2:
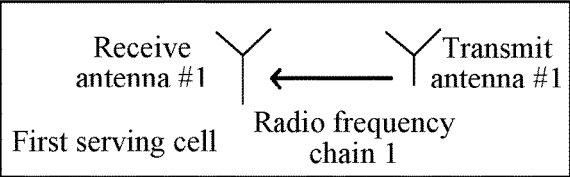
FIG. 2 is a schematic diagram of a transmission mechanism in the case where each serving cell is allocated one uplink transmit resource according to an embodiment.
Figure 2:
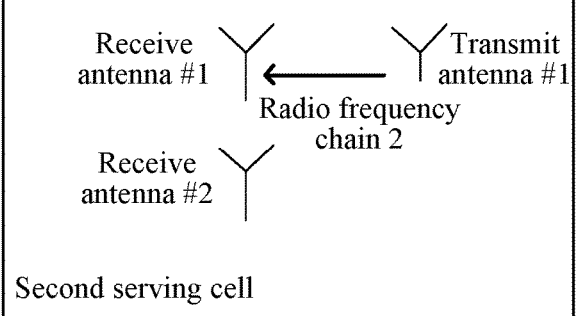
Figure 2:
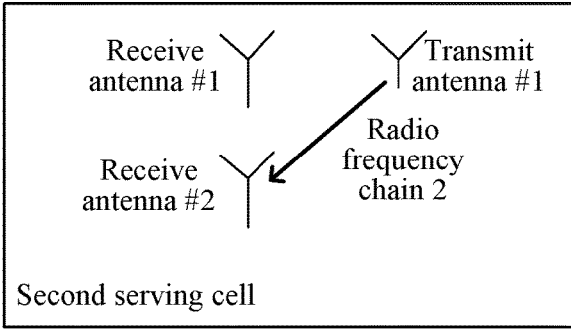

FIG. 2 is a schematic diagram of a transmission mechanism in the case where each serving cell is allocated one uplink transmit resource according to an embodiment. As shown in FIG. 2, the number (y=2) of receive antennas supported by the terminal on the second serving cell (serving cell 2) is greater than 1, and then the transmission mechanism may be determined to be the following according to the uplink configuration information and the uplink transmit resource allocation information: for the first serving cell (serving cell 1), the terminal uses radio frequency chain 1 to transmit the uplink signal (SRS); and for serving cell 2, the terminal uses one radio frequency chain (that is, radio frequency chain 2) allocated to serving cell 2 and sequentially uses different antennas (that is, uses different time domain resource units) to send uplink signals on SRS resources or SRS resource sets configured to serving cell 2 and corresponding to different antennas. Accordingly, for serving cell 1, the serving node may receive the uplink signal through radio frequency chain 1 according to the transmission mechanism; and for serving cell 2, the serving node may sequentially receive the uplink signals sent on the SRS resources or the SRS resource sets of different antennas through radio frequency chain 2. In this manner, the reliability of the uplink signal transmission is improved, and the comprehensive downlink channel information is acquired.

Figure 3:
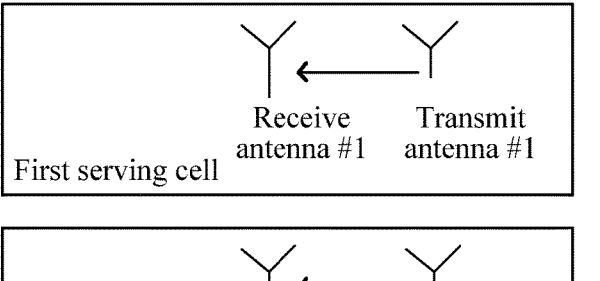
FIG. 3 is a schematic diagram of a transmission mechanism in the case where an uplink transmit resource is allocated to a serving cell having an uplink signal transmit demand in a set time period according to an embodiment.
Figure 3:
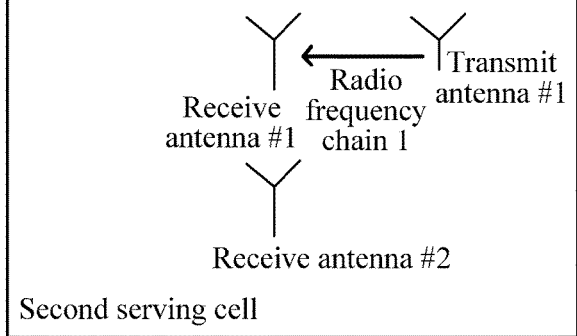
Figure 3:
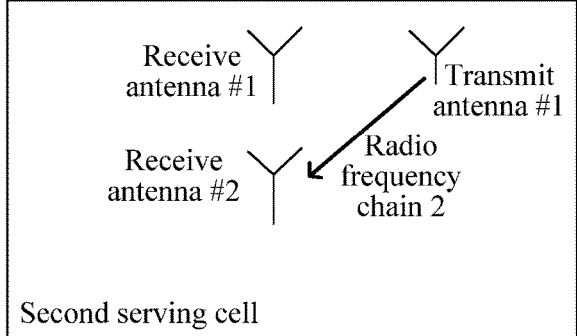

FIG. 3 is a schematic diagram of a transmission mechanism in the case where an uplink transmit resource is allocated to a serving cell having an uplink signal transmit demand in a set time period according to an embodiment. In this embodiment, a radio frequency chain is allocated by the terminal to the serving cell having the transmit demand in the set time period. As shown in FIG. 3, if it is necessary to send the SRS on only the second serving cell (serving cell 2) in the set time period, the uplink transmit resource allocation information may be that the terminal allocates two radio frequency chains to serving cell 2. The transmission mechanism may be determined to be the following according to the uplink configuration information and the uplink transmit resource allocation information: the terminal sequentially uses different radio frequency chains (that is, uses different time domain resource units) on serving cell 2 to transmit SRSs on different SRS resources or SRS resource sets through different antennas and does not transmit the uplink signal on serving cell 1 in the set time period. Accordingly, for the first serving cell (serving cell 1), the serving node instructs that the uplink signal is not received in the set time period according to the transmission mechanism; and for serving cell 2, the uplink signals may be received on different SRS resources or SRS resource sets through different antennas and through different radio frequency chains in the set time period. In this manner, the reliability of the uplink signal transmission is improved, and the comprehensive downlink channel information is acquired.

If the terminal needs to send an SRS on each of serving cell 1 and serving cell 2 in the set time period, that is, each of serving cell 1 and serving cell 2 has an uplink signal transmit demand in the set time period, the uplink transmit resource allocation information may be that the terminal allocates radio frequency chain 1 to serving cell 1 for sending the SRS on serving cell 1; and the terminal allocates radio frequency chain 2 to serving cell 2 for sending the SRS on serving cell 2. The transmission mechanism in this case is shown in FIG. 2. If the number of receive antennas supported by the terminal on one serving cell is greater than or equal to 2, the transmission mechanism includes that: the terminal uses one radio frequency link allocated to the serving cell and sequentially uses different antennas (that is, uses different time domain resource units) to send SRSs on SRS resources or SRS resource sets configured to the serving cell and corresponding to different antennas. Accordingly, for a serving cell in which the number of supported receive antennas is greater than or equal to 2, the serving node may receive the uplink signals on different SRS resources or SRS resource sets through different antennas and through one radio frequency chain in the set time period according to the transmission mechanism. In this manner, the reliability of the uplink signal transmission is improved, and the comprehensive downlink channel information is acquired.

In an embodiment, the set time period includes one time unit or a plurality of consecutive time units. The time unit includes at least one of the following: a radio frame, a subframe, a slot, a mini-slot or an orthogonal frequency-division multiplexing (OFDM) symbol.

In an embodiment, the transmission mechanism includes that: the terminal releases all or part of the uplink transmit resources allocated to the first serving cell, and the released uplink transmit resources are configured for transmission of the uplink signal in the second serving cell.

In this embodiment, the transmission mechanism includes that: the terminal releases all or part of the uplink transmit resources allocated to the first serving cell, and the released uplink transmit resources are configured for transmission of the uplink signal in the second serving cell. For example, in a CA scenario or a DC scenario, the serving node may configure the terminal to receive and send signals on multiple serving cells. The serving node may configure each serving cell whether to allow the terminal to transmit a PUSCH or a PUCCH on the serving cell. On some serving cells, the terminal may not support PUSCH transmission or PUCCH transmission. To enable the serving node to obtain the downlink channel information of all serving cells according to the channel reciprocity, it is necessary to configure the terminal to transmit SRSs for antenna selection on all serving cells, regardless of whether PUSCH transmission or PUCCH transmission is supported on the serving cells. For a serving cell not supporting PUSCH transmission or PUCCH transmission, the terminal may not allocate a radio frequency chain for uplink transmission in the serving cell. In this case, all or part of the uplink transmit resources of the serving cells supporting PUSCH transmission or PUCCH transmission may be handed over to the serving cell not supporting the PUSCH transmission or the PUCCH transmission.

For example, the serving node may configure a source cell for the serving cell not supporting the PUSCH transmission or the PUCCH transmission by a radio resource control (RRC) signaling. On this basis, after the terminal completes uplink signal transmission in the configured source cell, the terminal may hand over the radio frequency chain applied to the source cell to a target cell (that is, the serving cell not supporting the PUSCH transmission or the PUCCH transmission), so that the target cell can send an SRS. In this case, the source cell is the first serving cell, and the target cell is the second serving cell.

In an embodiment, the first serving cell includes at least one of the following: a source cell of the second serving cell, where the source cell of the second serving cell is configured by the serving node; a cell other than the source cell of the second serving cell; a cell sharing an uplink transmit resource with the source cell of the second serving cell; a cell having a transmit demand in a set time period; or a cell configured with a target resource for transmission of an uplink signal.

In this embodiment, the transmission mechanism includes releasing all or part of the uplink transmit resources of the source cell of the second serving cell, releasing all or part of the uplink transmit resources of the cell other than the source cell of the second serving cell, releasing all or part of the uplink transmit resources of the cell sharing the uplink transmit resource with the source cell of the second serving cell, releasing all or part of the uplink transmit resources of the cell having the transmit demand in the set time period, and/or releasing all or part of the uplink transmit resources of the cell configured with the target resource for transmission of the uplink signal, and allocating the released uplink resources to the second serving cell for uplink signal transmission in the second serving cell.

In an embodiment, the second serving cell includes at least one of the following: a target cell configured with the source cell; a cell configured with the target resource for transmission of the uplink signal; a serving cell not supporting PUSCH transmission or PUCCH transmission; a cell in which the antenna configuration information satisfies a first condition, where the first condition includes that the number of transmit antennas supported by the terminal in the second serving cell is greater than or equal to 2; a cell in which the antenna configuration information satisfies a second condition, where the second condition includes that the number of transmit antennas supported by the terminal in the second serving cell is 1; a cell in which the format of the DCI for scheduling uplink transmission is the first format, where the first format includes format 0_0; a cell in which the format of the DCI for scheduling the uplink transmission is the second format, where the second format includes a format other than format 0_0; a cell in which the number of ports supported by the uplink resource used for the codebook is a first number, where the first number is 1; or a cell in which the number of ports supported by the uplink resource used for the codebook is a second number, where the second number is greater than or equal to 2.

In this embodiment, the transmission mechanism includes that: the terminal releases all or part of the uplink transmit resources of the first serving cell and hands over the released uplink transmit resources to the target cell configured with the source cell, to the cell configured with the target resource for transmission of the uplink signal, to the serving cell not supporting the PUSCH transmission or the PUCCH transmission, to the cell in which the number of transmit antennas supported by the terminal is greater than or equal to 2, to the cell in which the number of transmit antennas supported by the terminal is 1, to the cell in which the format of the DCI for scheduling the uplink transmission in the second serving cell is format 0_0, to the cell in which the format of the DCI for scheduling the uplink transmission in the second serving cell is the format other than format 0_0, to the cell in which the number of ports supported by the uplink resource used for the codebook is 1, and/or to the cell in which the number of ports supported by the uplink resource used for the codebook is greater than 1.

In an embodiment, the transmission mechanism includes that: in the uplink transmit resources of the first serving cell, an uplink transmit resource not released by the terminal is configured for transmission of the uplink signal in the first serving cell; or the terminal hands over part of the uplink resources of the first serving cell to a third serving cell and the part of the uplink resources are configured for transmission of an uplink signal on the third serving cell.

In this embodiment, the terminal may hand over part of the uplink transmit resources of the first serving cell to the second serving cell for transmission of the uplink signal in the second serving cell. The remaining uplink transmit sources not handed over to the second serving cell may be retained in the first serving cell for transmission of the uplink signal in the first serving cell or may be handed over to the third serving cell for transmission of the uplink signal in the third serving cell.

According to the method of the preceding embodiment, in the complex case of different uplink configuration information, flexibility of uplink transmit resource allocation or uplink transmit resource handover is improved, the reliability of the uplink signal transmission is further improved, and it is ensured that the serving node can comprehensively receive the uplink signal and acquire the comprehensive downlink channel information.

The transmission mechanism (the terminal releases all or part of the uplink transmit resources of the first serving cell and hands over these uplink transmit resources to the second serving cell) is described below through example two.

Example Two

For a terminal, a serving node configures three serving cells for the terminal, that is, serving cell 1 (that is, a first serving cell), serving cell 2 (that is, a third serving cell), and serving cell 3 (that is, a second serving cell). The serving node configures, by an RRC signaling, the terminal not to support transmitting a PUSCH or a PUCCH on serving cell 3, to support transmitting a PUSCH or a PUCCH on serving cell 1 and to support transmitting a PUSCH or a PUCCH on serving cell 2 or not to support transmitting a PUSCH or a PUCCH on serving cell 2. The serving node configures SRS resources or SRS resource sets used for antenna selection on the three serving cells. The serving node configures an SRS resource or an SRS resource set used for a codebook on serving cell 1. If the serving node configures the terminal to support transmitting the PUSCH or the PUCCH on serving cell 2, the serving node also configures an SRS resource or an SRS resource set used for a codebook on serving cell 2. For serving cell 3, the serving node configures the source cell of serving cell 3 as serving cell 1. In this case, serving cell 1 is the first serving cell, and serving cell 3 is the second serving cell. If the terminal needs to transmit an uplink signal on an SRS resource or an SRS resource set of serving cell 3, the transmission mechanism includes that: the terminal hands over the uplink transmit resource allocated to serving cell 1 to serving cell 3 according to the uplink configuration information. The uplink configuration information includes antenna configuration information, format information of DCI for scheduling uplink transmission and/or information about the number of ports supported by an SRS resource or an SRS resource set used for a codebook.

In case one, for serving cell 1, the antenna configuration information supportable by the terminal is 1T 1R, and/or on serving cell 1, the number of ports supported by the SRS resource or the SRS resource set used for the codebook and configured by the serving node to the terminal is 1; and for serving cell 3, the antenna configuration supportable by the terminal is 1T xR, where x denotes one of {1, 2, 4, 8, 16, 32, 64, 128}, and/or on serving cell 3, the number of ports supported by the SRS resource or the SRS resource set used for the codebook and configured by the serving node to the terminal is 1. Accordingly, it may be determined that the transmission mechanism includes that: the terminal uses one radio frequency chain to complete uplink transmission in serving cell 1, and in the case where the terminal is ready to perform uplink transmission in serving cell 3, the terminal hands over the one radio frequency chain originally applied to the uplink transmission of serving cell 1 to serving cell 3.

The terminal may also determine how to transmit the uplink signal on serving cell 3 through the system predefinition or the semi-static configuration of the serving node.

(1) If the capability of the terminal on serving cell 3 supports only one receive antenna, and/or on serving cell 3, the number of ports supported by the SRS resource or the SRS resource set used for the codebook and configured by the serving node to the terminal is 1 (that is, x=1 in the antenna configuration information), accordingly, it may be determined that the transmission mechanism includes that: the terminal may use one radio frequency chain handed over from serving cell 1 to serving cell 3, and on one antenna corresponding to the radio frequency chain, send an SRS on the SRS resource or the SRS resource set configured for serving cell 3. Accordingly, according to the transmission mechanism, the serving node may receive the SRS on the SRS resource or the SRS resource set configured for serving cell 3 through the one antenna corresponding to the one radio frequency chain handed over from serving cell 1 to serving cell 3, so that after the downlink channel information of serving cell 1 is acquired, the downlink channel information of serving cell 3 is acquired. In this manner, the reliability of the uplink signal transmission is improved.

(2) If the capability of a user equipment (UE) on serving cell 3 supports more than one receive antenna, and/or on serving cell 3, the number of ports supported by the SRS resource or the SRS resource set used for the codebook and configured by the serving node for the terminal is greater than 1 (that is, x>1 in the antenna configuration information), accordingly, it may be determined that the transmission mechanism includes that: the terminal may use one radio frequency chain handed over from serving cell 1 to serving cell 3 and sequentially use different antennas (that is, uses different time domain resource units) to send SRSs on SRS resources or SRS resource sets configured for serving cell 3 and corresponding to different antennas. Accordingly, according to the transmission mechanism, the serving node may receive the SRSs on the SRS resources or the SRS resource sets configured for serving cell 3 through the one radio frequency chain and different antennas in sequence and handed over from serving cell 1 to serving cell 3, so that after the downlink channel information of serving cell 1 is acquired, the comprehensive downlink channel information of serving cell 3 is acquired. In this manner, the reliability of the uplink signal transmission is improved.

In case two, the antenna configuration information, on serving cell 1, supported by the terminal is 1T x1R, and/or on serving cell 1, the number of ports supported by the SRS resource or the SRS resource set used for the codebook and configured by the serving node for the terminal is 1; and the antenna configuration information, on serving cell 3, supported by the terminal is 1T x2R, and/or on serving cell 3, the number of ports supported by the SRS resource or the SRS resource set used for the codebook and configured by the serving node for the terminal is 1. Each of x1 and x2 denotes one of {2, 4, 8, 16, 32, 64, 128}. x1 and x2 may be equal or unequal. Accordingly, it may be determined that the transmission mechanism includes that: the terminal uses two radio frequency chains on serving cell 1 to send SRSs on two SRS resources or SRS resource sets; and if the terminal also needs to send an SRS on the SRS resource or the SRS resource set of serving cell 3, the terminal hands over all or part of radio frequency chains applied to the uplink transmission of serving cell 1 to serving cell 3.

The terminal may also determine how to transmit uplink signals on serving cell 1 and serving cell 3 through the system predefinition or the semi-static configuration of the serving node.

(1) The transmission mechanism may be as follows: the terminal hands over the two radio frequency chains originally applied to the uplink transmission of serving cell 1 to serving cell 3. The terminal sequentially uses different radio frequency chains (that is, uses different time domain resource units) on serving cell 3 to transmit SRSs on different SRS resources or SRS resource sets through different antennas. The terminal cannot continue the uplink transmission in serving cell 1. Accordingly, according to the transmission mechanism, the serving node may use the two radio frequency chains on serving cell 1 to receive SRSs on the two SRS resources or SRS resource sets and may also use the two radio frequency chains handed over from serving cell 1 to serving cell 3 to receive SRSs on different SRS resources or SRS resource sets through different antennas in sequence. In this manner, the reliability of the uplink signal transmission is improved, and after the downlink channel information of serving cell 1 is acquired, the comprehensive downlink channel information of serving cell 3 is acquired.

(2) The transmission mechanism may be as follows: the terminal hands over one of the two radio frequency chains originally applied to the uplink transmission of serving cell 1 to serving cell 3, and the other radio frequency chain remains on serving cell 1. During uplink transmission of serving cell 3, the terminal can use only one radio frequency chain to perform uplink signal transmission in both serving cell 1 and serving cell 3. In the process in which the serving node schedules the terminal to send an uplink PUSCH, an uplink PUCCH, an uplink SRS or an uplink physical random access channel (PRACH) on serving cell 1, only default DCI (the format of DCI is format 0_0), DCI of DCI format 0_1 for which the number of associated SRS ports is 1 or DCI of DCI format 0_2 for which the number of associated SRS ports is 1 can be used for scheduling, and the uplink transmission sent by the terminal can support only single port transmission. For serving cell 3, the terminal uses one radio frequency chain and sequentially uses different antennas (that is, uses different time domain resource units) to send the SRSs on the SRS resources or the SRS resource sets configured for serving cell 3 and corresponding to different antennas. Accordingly, according to the transmission mechanism, the serving node can use only the DCI of DCI format 0_0 for scheduling uplink transmission, and the serving node may use the two radio frequency chains on serving cell 1 to receive the SRSs on the 2 SRS resources or SRS resource sets. For serving cell 3, the serving node may also use the one radio frequency chain handed over from serving cell 1 to serving cell 3 to receive SRSs through SRS resources or SRS resource sets of different antennas in sequence. In this manner, the reliability of the uplink signal transmission is improved, and after the downlink channel information of serving cell 1 is acquired, the comprehensive downlink channel information of serving cell 3 is acquired.

(3) The transmission mechanism may be as follows: the terminal hands over one of the two radio frequency chains originally applied to the uplink transmission of serving cell 1 to serving cell 3, and the other radio frequency chain is handed over to serving cell 2 to perform uplink transmission in serving cell 2. For serving cell 2, the terminal uses one radio frequency chain and sequentially uses different antennas (that is, uses different time domain resource units) to send SRSs on SRS resources or SRS resource sets configured for serving cell 2 and corresponding to different antennas. Accordingly, according to the transmission mechanism, the serving node may use the two radio frequency chains on serving cell 1 to receive the SRSs on the two SRS resources or SRS resource sets and may also receive SRS on SRS resource or SRS resource set configured for serving cell 2 through the one radio frequency chain and different antennas in sequence and handed over from serving cell 1 to serving cell 2. In this manner, the reliability of the uplink signal transmission is improved, and after the downlink channel information of serving cell 1 is acquired, the comprehensive downlink channel information of serving cell 2 is acquired.

In case three, the antenna configuration information, on serving cell 1, supported by the terminal is 1T x1R, and/or on serving cell 1, the number of ports supported by the SRS resource or the SRS resource set used for the codebook and configured by the serving node for the terminal is 1; and the antenna configuration, on serving cell 3, supported by the terminal is 2T x2R, and/or on serving cell 3, the number of ports supported by the SRS resource or the SRS resource set used for the codebook and configured by the serving node for the terminal is greater than or equal to 2. x1 denotes one of {1, 2, 4, 8, 16, 32, 64, 128}. x2 denotes one of {2, 4, 8, 16, 32, 64, 128}. x1 and x2 may be equal or unequal. If the terminal uses one radio frequency chain on serving cell 1 to send an SRS on one SRS resource or SRS resource set, the transmission mechanism includes that: the terminal hands over one radio frequency chain originally applied to the uplink transmission of serving cell 1 to serving cell 3.

The terminal may also determine how to transmit the uplink signal on serving cell 3 through the system predefinition or the semi-static configuration of the serving node.

In this case, the transmission mechanism includes that: the terminal uses the one radio frequency chain handed over from serving cell 1 to serving cell 3 and sequentially uses different antennas (that is, uses different time domain resource units) to send the SRSs on the SRS resources or the SRS resource sets configured for serving cell 3 and corresponding to different antennas. Accordingly, according to the transmission mechanism, the serving node may use the one radio frequency chain handed over from serving cell 1 to serving cell 3 and sequentially use different antennas to receive the SRSs on the SRS resources or the SRS resource sets configured for serving cell 3 through different antennas in sequence. In this manner, the reliability of the uplink signal transmission is improved, and after the downlink channel information of serving cell 1 is acquired, the comprehensive downlink channel information of serving cell 3 is acquired.

In case four, the antenna configuration information, on serving cell 1, supported by the terminal is 2T x1R, and/or on serving cell 1, the number of ports supported by the SRS resource or the SRS resource set used for the codebook and configured by the serving node for the terminal is greater than or equal to 2; and the antenna configuration, on serving cell 3, supported by the terminal is 1T x2R, and/or on serving cell 3, the number of ports supported by the SRS resource or the SRS resource set used for the codebook and configured by the serving node for the terminal is 1. x1 denotes one of {2, 4, 8, 16, 32, 64, 128}. x2 denotes one of {2, 4, 8, 16, 32, 64, 128}. x1 and x2 may be equal or unequal. If the terminal uses the two radio frequency chains on serving cell 1 to send the SRSs on the two SRS resources or SRS resource sets, and the terminal needs to send the SRS on the SRS resource or the SRS resource set of serving cell 3, the transmission mechanism includes that: the terminal hands over all or part of radio frequency chains applied to uplink sending of serving cell 1 to serving cell 3 to perform SRS sending, and/or hands over the part of radio frequency chains applied to the uplink sending of serving cell 1 to serving cell 2 to perform uplink sending.

The terminal may also determine how to transmit uplink signals on serving cell 1, serving cell 2 and serving cell 3 through the system predefinition or the semi-static configuration of the serving node.

(1) The transmission mechanism includes that: the terminal hands over one of the two radio frequency chains originally applied to the uplink transmission of serving cell 1 to serving cell 3, and the other radio frequency chain remains on serving cell 1. In this manner, the terminal can use only one radio frequency chain to perform uplink transmission in both serving cell 1 and serving cell 3, and the uplink transmission sent by the terminal can support only the single port transmission. For serving cell 3, the terminal uses the one radio frequency chain and sequentially uses different antennas (that is, uses different time domain resource units) to send the SRSs on the SRS resources or the SRS resource sets configured for serving cell 3 and corresponding to different antennas. Accordingly, according to the transmission mechanism, when the serving node schedules the terminal to send the uplink PUSCH or PUCCH or SRS or PRACH on serving cell 1, only the DCI of DCI format 0_0, the DCI of DCI format 0_1 for which the number of associated SRS ports is 1 or the DCI of DCI format 0_2 for which the number of associated SRS ports is 1 can be used for scheduling. For serving cell 3, the serving node uses the one radio frequency chain handed over from serving cell 1 to serving cell 3 and sequentially uses different antennas to receive an SRS on the SRS resource or the SRS resource set configured for serving cell 3. In this manner, the reliability of the uplink signal transmission is improved, and after the downlink channel information of serving cell 1 is acquired, the comprehensive downlink channel information of serving cell 3 is acquired.

(2) The transmission mechanism includes that: the terminal hands over one of the two radio frequency chains originally applied to the uplink transmission of serving cell 1 to serving cell 3, and the other radio frequency chain is handed over to serving cell 2 to perform the uplink transmission. For serving cell 2 or serving cell 3, the terminal uses the one radio frequency chain and sequentially uses different antennas (that is, uses different time domain resource units) to send the SRSs on the SRS resources or the SRS resource sets configured for serving cell 2 or serving cell 3 and corresponding to different antennas. Accordingly, according to the transmission mechanism, when the serving node schedules the terminal to send the uplink PUSCH or PUCCH or SRS or PRACH on serving cell 1, only the DCI of DCI format 0_0, the DCI of DCI format 0_1 for which the number of associated SRS ports is 1 or the DCI of DCI format 0_2 for which the number of associated SRS ports is 1 can be used for scheduling. For serving cell 2 or serving cell 3, the serving node uses the one radio frequency chain handed over from serving cell 1 to serving cell 2 or serving cell 3 and sequentially uses different antennas to receive the SRS on the SRS resource or the SRS resource set configured for serving cell 2 or serving cell 3. In this manner, the reliability of the uplink signal transmission is improved, and after the downlink channel information of serving cell 1 is acquired, the comprehensive downlink channel information of serving cell 2 or serving cell 3 is acquired.

In case five, if the antenna configuration information, on serving cell 1, supported by the terminal is 2T x1R, and/or on serving cell 1, the number of ports supported by the SRS resource or the SRS resource set used for the codebook and configured by the serving node for the terminal is greater than or equal to 2; and the antenna configuration, on serving cell 3, supported by the terminal is 1T x2R, and/or on serving cell 3, the number of ports supported by the SRS resource or the SRS resource set used for the codebook and configured by the serving node for the terminal is 1. Each of x1 and x2 denotes one of {2, 4, 8, 16, 32, 64, 128}. x1 and x2 may be equal or unequal. If the terminal uses two radio frequency chains to send uplink transmission in serving cell 1, the transmission mechanism includes that: the terminal hands over all or part of radio frequency chains applied to uplink sending of serving cell 1 to serving cell 3 to perform SRS sending.

The terminal may also determine how to transmit the uplink signals on serving cell 1 and serving cell 3 through the system predefinition or the semi-static configuration of the serving node.

(1) The transmission mechanism includes that: the terminal hands over one of the two radio frequency chains originally applied to the uplink transmission of serving cell 1 to serving cell 3, and the other radio frequency chain remains on serving cell 1. In this manner, the terminal can use only one radio frequency chain to perform uplink transmission in both serving cell 1 and serving cell 3, and the uplink transmission sent by the terminal can support only single port transmission. For serving cell 3, the terminal uses the one radio frequency chain and sequentially uses different antennas (that is, uses different time domain resource units) to send the SRSs on the SRS resources or the SRS resource sets configured for serving cell 3 and corresponding to different antennas. Accordingly, when the serving node schedules the terminal to send the uplink PUSCH or PUCCH or SRS or PRACH on serving cell 1, only the DCI of DCI format 0_0, the DCI of DCI format 0_1 for which the number of associated SRS ports is 1 or the DCI of DCI format 0_2 for which the number of associated SRS ports is 1 can be used for scheduling. For serving cell 3, the serving node uses the one radio frequency chain handed over from serving cell 1 to serving cell 3 and sequentially uses different antennas to receive the SRS on the SRS resource or the SRS resource set configured for serving cell 2 or serving cell 3. In this manner, the reliability of the uplink signal transmission is improved, and after the downlink channel information of serving cell 1 is acquired, the comprehensive downlink channel information of serving cell 3 is acquired.

(2) The transmission mechanism includes that: the terminal hands over the two radio frequency chains originally applied to the uplink transmission of serving cell 1 to serving cell 3. The terminal sequentially uses different radio frequency chains (that is, uses different time domain resource units) on serving cell 3 to transmit the SRSs on different SRS resources or SRS resource sets through different antennas. The terminal cannot continue the uplink transmission in serving cell 1. Accordingly, for serving cell 3, the serving node uses the two radio frequency chains handed over from serving cell 1 to serving cell 3 and sequentially uses different antennas to receive the SRS on the SRS resource or the SRS resource set configured for serving cell 2 or serving cell 3. In this manner, the reliability of the uplink signal transmission is improved, and after the downlink channel information of serving cell 1 is acquired, the comprehensive downlink channel information of serving cell 3 is acquired.

In an embodiment, the transmission mechanism includes at least one of the following: the terminal hands over the uplink transmit resource of the third serving cell to the second serving cell; the terminal determines, according to uplink configuration information of the first serving cell, whether to hand over the uplink transmit resource of the third serving cell to the second serving cell; or the terminal determines, according to uplink configuration information of the second serving cell, whether to hand over the uplink transmit resource of the third serving cell to the second serving cell.

In an embodiment, the terminal determines, according to the uplink configuration information of the second serving cell, whether to hand over the uplink transmit resource of the third serving cell to the second serving cell in at least one of the manners below.

(1) The uplink configuration information includes antenna configuration information. In the case where the number of transmit antennas supported in the antenna configuration information is greater than or equal to 2, the terminal hands over the uplink transmit resource of the third serving cell to the second serving cell. That is, the transmission mechanism includes that the number of transmit antennas supported by the second serving cell is greater than or equal to 2, and then the uplink transmit resource of the third serving cell is handed over to the second serving cell.

(2) The uplink configuration information includes the antenna configuration information. In the case where the number of transmit antennas supported in the antenna configuration information is 1, the uplink transmit resource of the third serving cell is not handed over to the second serving cell. That is, the transmission mechanism includes that the number of transmit antennas supported by the second serving cell is equal to 1, and then the uplink transmit resource of the third serving cell does not need to be handed over to the second serving cell.

(3) The uplink configuration information includes format information of DCI for scheduling uplink transmission. In the case where the format of the DCI for scheduling the second serving cell is the format other than format 0_0, the terminal hands over the uplink transmit resource of the third serving cell to the second serving cell. That is, the transmission mechanism includes that the format of the DCI for scheduling the uplink transmission of the second serving cell is the format other than format 0_0, and then the terminal may hand over the uplink transmit resource of the third serving cell to the second serving cell.

(4) The uplink configuration information includes the format information of the DCI for scheduling the uplink transmission. In the case where the format of the DCI for scheduling the second serving cell is format 0_0, the uplink transmit resource of the third serving cell is not handed over to the second serving cell. That is, the transmission mechanism includes that the format of the DCI for scheduling the uplink transmission of the second serving cell is format 0_0, and then the terminal does not need to hand over the uplink transmit resource of the third serving cell to the second serving cell.

(5) The uplink configuration information includes information about the number of ports supported by an uplink resource used for a codebook. In the case where the number of the ports supported by the uplink resource used for the codebook is greater than or equal to 2, the terminal hands over the uplink transmit resource of the third serving cell to the second serving cell. That is, the transmission mechanism includes that the number of the ports supported by the uplink resource of the second serving cell used for the codebook is greater than or equal to 2, and then the terminal may hand over the uplink transmit resource of the third serving cell to the second serving cell.

(6) The uplink configuration information includes the information about the number of the ports supported by the uplink resource used for the codebook. In the case where the number of the ports supported by the uplink resource used for the codebook is equal to 1, the uplink transmit resource of the third serving cell is not handed over to the second serving cell. That is, the transmission mechanism includes that the number of the ports supported by the uplink resource of the second serving cell used for the codebook is equal to 1, and then the terminal does not need to hand over the uplink transmit resource of the third serving cell to the second serving cell.

In an embodiment, the terminal determines, according to the uplink configuration information of the first serving cell, whether to hand over the uplink transmit resource of the third serving cell to the second serving cell in at least one of the manners below.

(1) The uplink configuration information is antenna configuration information. In the case where the number of transmit antennas supported in the antenna configuration information is equal to 1, the terminal hands over the uplink transmit resource of the third serving cell to the second serving cell. That is, the transmission mechanism includes that the number of transmit antennas supported by the first serving cell is equal to 1, and then the uplink transmit resource of the third serving cell is handed over to the second serving cell.

(2) The uplink configuration information is the antenna configuration information. In the case where the number of the transmit antennas supported in the antenna configuration information is greater than or equal to 2, the uplink transmit resource of the third serving cell is not handed over to the second serving cell. That is, the transmission mechanism includes that the number of the transmit antennas supported by the first serving cell is greater than or equal to 2, and then the uplink transmit resource of the third serving cell does not need to be handed over to the second serving cell.

(3) The uplink configuration information is format information of DCI for scheduling uplink transmission. In the case where the format of the DCI for scheduling the first serving cell is format 0_0, the terminal hands over the uplink transmit resource of the third serving cell to the second serving cell. That is, the transmission mechanism includes that the format of the DCI for scheduling the uplink transmission of the first serving cell is format 0_0, and then the terminal may hand over the uplink transmit resource of the third serving cell to the second serving cell.

(4) The uplink configuration information is the format information of the DCI for scheduling the uplink transmission. In the case where the format of the DCI for scheduling the first serving cell is the format other than format 0_0, the uplink transmit resource of the third serving cell is not handed over to the second serving cell. That is, the transmission mechanism includes that the format of the DCI for scheduling the uplink transmission of the first serving cell is the format other than format 0_0, and the terminal does not need to hand over the uplink transmit resource of the third serving cell to the second serving cell.

(5) The uplink configuration information is information about the number of ports supported by an uplink resource used for a codebook. In the case where the number of the ports supported by the uplink resource used for the codebook is equal to 1, the terminal hands over the uplink transmit resource of the third serving cell to the second serving cell. That is, the transmission mechanism includes that the number of the ports supported by the uplink resource of the first serving cell used for the codebook is greater than or equal to 2, and then the terminal may hand over the uplink transmit resource of the third serving cell to the second serving cell.

(6) The uplink configuration information is the information about the number of the ports supported by the uplink resource used for the codebook. In the case where the number of the ports supported by the uplink resource used for the codebook is greater than or equal to 2, the uplink transmit resource of the third serving cell is not handed over to the second serving cell. That is, the transmission mechanism includes that the number of the ports supported by the uplink resource of the first serving cell used for the codebook is greater than or equal to 2, and then the terminal does not need to hand over the uplink transmit resource of the third serving cell to the second serving cell.

In an embodiment, the terminal determines, according to the uplink configuration information of the third serving cell, whether to hand over the uplink transmit resource of the third serving cell to the second serving cell in at least one of the manners below.

(1) The uplink configuration information is antenna configuration information. In the case where the number of transmit antennas supported in the antenna configuration information is greater than or equal to 2, the terminal hands over the uplink transmit resource of the third serving cell to the second serving cell. That is, the transmission mechanism includes that the number of the transmit antennas supported by the third serving cell is greater than or equal to 2, and then the uplink transmit resource of the third serving cell is handed over to the second serving cell.

(2) The uplink configuration information is the antenna configuration information. In the case where the number of the transmit antennas supported in the antenna configuration information is equal to 1, the uplink transmit resource of the third serving cell is not handed over to the second serving cell. That is, the transmission mechanism includes that the number of the transmit antennas supported by the third serving cell is equal to 1, and then the uplink transmit resource of the third serving cell does not need to be handed over to the second serving cell.

(3) The uplink configuration information is format information of DCI for scheduling uplink transmission. In the case where the format of the DCI for scheduling the third serving cell is the format other than format 0_0, the terminal hands over the uplink transmit resource of the third serving cell to the second serving cell. That is, the transmission mechanism includes that the format of the DCI for scheduling the uplink transmission of the third serving cell is the format other than format 0_0, and then the terminal may hand over the uplink transmit resource of the third serving cell to the second serving cell.

(4) The uplink configuration information is the format information of the DCI for scheduling the uplink transmission. In the case where the format of the DCI for scheduling the third serving cell is format 0_0, the uplink transmit resource of the third serving cell is not handed over to the second serving cell. That is, the transmission mechanism includes that the format of the DCI for scheduling the uplink transmission of the third serving cell is format 0_0, and then the terminal does not need to hand over the uplink transmit resource of the third serving cell to the second serving cell.

(5) The uplink configuration information is information about the number of ports supported by an uplink resource used for a codebook. In the case where the number of the ports supported by the uplink resource used for the codebook is greater than or equal to 2, the terminal hands over the uplink transmit resource of the third serving cell to the second serving cell. That is, the transmission mechanism includes that the number of the ports supported by the uplink resource of the third serving cell used for the codebook is greater than or equal to 2, and then the terminal may hand over the uplink transmit resource of the third serving cell to the second serving cell.

(6) The uplink configuration information is the information about the number of the ports supported by the uplink resource used for the codebook. In the case where the number of the ports supported by the uplink resource used for the codebook is equal to 1, the uplink transmit resource of the third serving cell is not handed over to the second serving cell. That is, the transmission mechanism includes that the number of the ports supported by the uplink resource of the third serving cell used for the codebook is equal to 1, and the terminal does not need to hand over the uplink transmit resource of the third serving cell to the second serving cell.

According to the preceding methods, in the complex case of different uplink configuration information, the flexibility of uplink transmit resource allocation or uplink transmit resource handover is improved, the reliability of the uplink signal transmission is further improved, and it is ensured that the serving node can comprehensively receive the uplink signal and acquire the comprehensive downlink channel information.

The transmission mechanism (the terminal determines whether to hand over the uplink transmit resource of the third serving cell to the second serving cell) is described below through example three.

Example Three

According to the configuration of a serving node, a terminal supports serving cell 1 (that is, a first serving cell), serving cell 2 (that is, a third serving cell) and serving cell 3 (that is, a second serving cell). The serving node configures, through RRC signaling, the terminal not to support transmitting a PUSCH or a PUCCH on serving cell 3, to support transmitting a PUSCH or a PUCCH on serving cell 1 and to support transmitting a PUSCH or a PUCCH on serving cell 2 or not to support transmitting a PUSCH or a PUCCH on serving cell 2. The terminal needs to send SRSs for antenna selection on serving cell 1, serving cell 2 and serving cell 3. The serving node configures an SRS resource or SRS resource set for each of the three serving cells for sending the SRSs. The serving node configures an SRS resource or an SRS resource set used for a codebook on serving cell 1. If the serving node configures the terminal to support transmitting the PUSCH or the PUCCH on serving cell 2, the serving node also configures an SRS resource or an SRS resource set used for a codebook on serving cell 2. For serving cell 3, the serving node configures the source cell of serving cell 3 as serving cell 1. In this case, the transmission mechanism may include that: after the terminal sends an SRS on serving cell 1, the terminal hands over a radio frequency chain of serving cell 1 to serving cell 3. On this basis, the transmission mechanism may also include that: the terminal determines, according to the uplink configuration information of the second serving cell, whether a radio frequency chain applied to serving cell 2 needs to be disconnected and handed over to serving cell 3. The transmission mechanism may also include that: the terminal determines, according to uplink configuration information of the first serving cell, whether the radio frequency chain applied to serving cell 2 needs to be disconnected and handed over to serving cell 3. The transmission mechanism may also include that: the terminal determines, according to uplink configuration information of the third serving cell, whether the radio frequency chain applied to serving cell 2 needs to be disconnected and handed over to serving cell 3. The uplink configuration information includes antenna configuration information, format information of DCI for scheduling uplink transmission and/or information about the number of ports supported by an uplink resource set used for a codebook.

In this example, for the transmission mechanism in which the terminal determines, according to the uplink configuration information of the second serving cell, whether the radio frequency chain applied to serving cell 2 needs to be disconnected and handed over to serving cell 3, the terminal may determine how to transmit an uplink signal on serving cell 3 through the system predefinition or the semi-static configuration of the serving node.

(1) The transmission mechanism includes that: the terminal determines whether to disconnect and hand over the radio frequency chain of serving cell 2 to serving cell 3 according to antenna configuration information of serving cell 3 and/or the number of ports supported by an SRS resource or an SRS resource set on serving cell 3 configured by the serving node for the terminal and used for a codebook. If the antenna configuration information of the terminal on serving cell 3 is 2T xR, and/or the number of the ports supported by the SRS resource or the SRS resource set on serving cell 3 configured by the serving node for the terminal and used for the codebook is greater than or equal to 2, where x may denote any one of {1, 2, 4, 8, 16, 32, 64, 128}, in the case where the terminal needs to send the SRS on the SRS resource or the SRS resource set of serving cell 3, the transmission mechanism includes that: the terminal may disconnect the radio frequency chain on serving cell 1 and the radio frequency chain on serving cell 2 and hand over the radio frequency chain on serving cell 1 and the radio frequency chain on serving cell 2 to serving cell 3. That is, the terminal not only needs to hand over the radio frequency chain on the source cell to serving cell 3, but also needs to hand the radio frequency chain on another serving cell (that is, serving cell 2 in this example, that is, the third serving cell) that supports PUSCH or PUCCH transmission and/or SRS transmission to serving cell 3. On this basis, the terminal cannot send uplink transmission in serving cell 1 and serving cell 2. Accordingly, for serving cell 3, according to the transmission mechanism, the serving node may receive an uplink signal by using the radio frequency chains handed over from serving cell 1 and serving cell 2 to serving cell 3.

Figure 4:
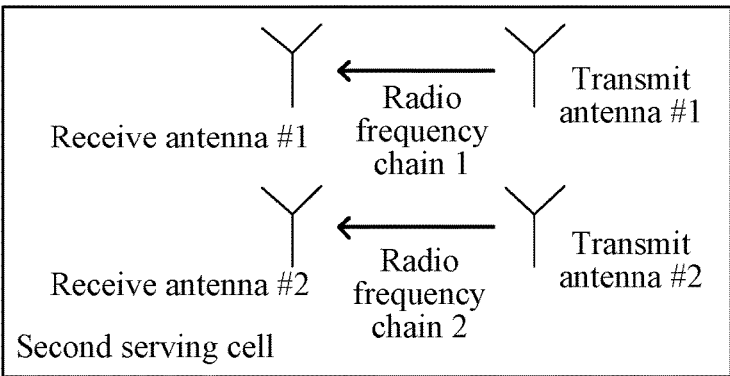
FIG. 4 is a schematic diagram of a transmission mechanism in the case where an uplink transmit resource of a third serving cell is handed over to a second serving cell according to an embodiment.

FIG. 4 is a schematic diagram of a transmission mechanism in the case where an uplink transmit resource of a third serving cell is handed over to a second serving cell according to an embodiment. As shown in FIG. 4, for serving cell 3 (that is, the second serving cell), the terminal may use two radio frequency chains handed over from serving cell 1 and serving cell 2 to serving cell 3 and use corresponding SRS resources or SRS resource sets to send SRSs on two antennas respectively, and the same or different time domain units may be used.

(2) The transmission mechanism includes that: the terminal determines, according to the antenna configuration information of serving cell 3, whether to hand over the uplink transmit resource of the third serving cell to the second serving cell. For example, whether to hand over the uplink transmit resource of the third serving cell to the second serving cell is determined according the number of the ports supported by the SRS resource or the SRS resource set on serving cell 3 used for the codebook and configured by the serving node for the terminal. If the antenna capability of the terminal on serving cell 3 is 1T xR, and/or the number of the ports supported by the SRS resource or the SRS resource set on serving cell 3 used for the codebook and configured by the serving node for the terminal is 1, where x may denote any one of {1, 2, 4, 8, 16, 32, 64, 128}, when the terminal needs to send the SRS on the SRS resource or the SRS resource set of serving cell 3, the transmission mechanism includes that: the terminal may disconnect the radio frequency chain of serving cell 1 and hand over the radio frequency chain originally applied to the uplink transmission of serving cell 1 to serving cell 3 for sending the SRS on serving cell 3 and does not need to disconnect and hand over the radio frequency chain of serving cell 2 to serving cell 3. Accordingly, for serving cell 3, the serving node may receive an uplink signal by using the radio frequency chain handed over from serving cell 1 to serving cell 3 according to the transmission mechanism.

Figure 5:
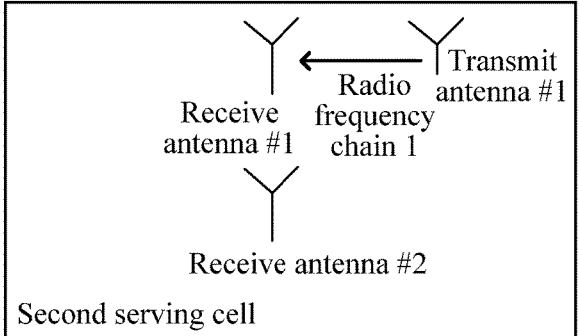
FIG. 5 is a schematic diagram of a transmission mechanism in the case where an uplink transmit resource of a third serving cell is not handed over to a second serving cell according to an embodiment.
Figure 5:
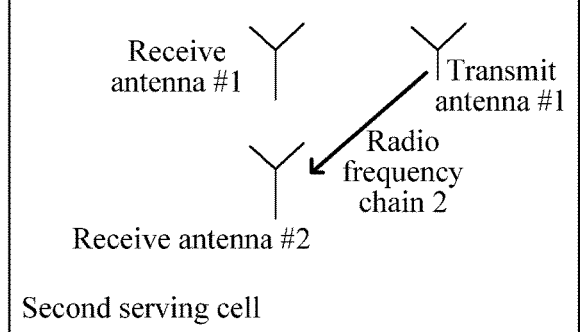

FIG. 5 is a schematic diagram of a transmission mechanism in the case where an uplink transmit resource of a third serving cell is not handed over to a second serving cell according to an embodiment. As shown in FIG. 5, the terminal does not need to disconnect the radio frequency chain on another serving cell (that is, serving cell 2 in this embodiment, that is, the third serving cell) that supports PUSCH/PUCCH transmission and/or SRS sending. On this basis, the terminal cannot send uplink transmission in serving cell 1, but may continue to send uplink transmission in serving cell 2. If the antenna capability on serving cell 3 is 1T 2R, that is, x is equal to 2, the terminal uses one radio frequency chain and uses different antennas to transmit SRSs on different time domain units (that is, uses different time domain resource units) or different SRS resources or different SRS resource sets in sequence.

(3) The transmission mechanism includes that: regardless of the antenna configuration information of the terminal on serving cell 3 or the number of the ports supported by the SRS resource or the SRS resource set on serving cell 3 configured by the serving node for the terminal and used for the codebook, the terminal disconnects the radio frequency chains applied to serving cell 1 and serving cell 2, so that each of the two radio frequency chains may be applied to the SRS sending of serving cell 3. Accordingly, for serving cell 3, the serving node may receive the uplink signal by using the radio frequency chains handed over from serving cell 1 and serving cell 2 to serving cell 3 according to the transmission mechanism.

In this example, for the transmission mechanism in which the terminal determines, according to the uplink configuration information of the first serving cell, whether the radio frequency chain applied to serving cell 2 needs to be disconnected and handed over to serving cell 3, the terminal may determine how to transmit the uplink signal on serving cell 3 through the system predefinition or the semi-static configuration of the serving node.

(1) The transmission mechanism includes that: the terminal determines whether to disconnect and hand over the radio frequency chain of serving cell 2 to serving cell 3 according to the antenna configuration information of serving cell 1 and/or the number of the ports supported by the SRS resource or the SRS resource set on serving cell 1 configured by the serving node for the terminal and used for the codebook. If the antenna configuration information of the terminal on serving cell 1 is 2T xR, and/or the number of the ports supported by the SRS resource or the SRS resource set on serving cell 1 used for the codebook and configured by the serving node for the terminal is greater than or equal to 2, where x may denote any one of {1, 2, 4, 8, 16, 32, 64, 128}, in the case where the terminal needs to send the SRS on the SRS resource or the SRS resource set of serving cell 3, the transmission mechanism includes that: the terminal does not need to disconnect the radio frequency chain of serving cell 2 and not needs to hand over the radio frequency chain of serving cell 2 to serving cell 3. Accordingly, for serving cell 3, the serving node may receive the uplink signal by using the radio frequency chain handed over from serving cell 1 to serving cell 3 according to the transmission mechanism.

(2) The transmission mechanism includes that: the terminal determines, according to the antenna configuration information of serving cell 1, whether to hand over the uplink transmit resource of the third serving cell to the second serving cell. For example, whether to hand over the uplink transmit resource of the third serving cell to the second serving cell is determined according to the number of the ports supported by the SRS resource or the SRS resource set on serving cell 1 used for the codebook and configured by the serving node for the terminal. If the antenna capability of the terminal on serving cell 1 is 1T xR and/or the number of the ports supported by the SRS resource or the SRS resource set on serving cell 1 used for the codebook and configured by the serving node for the terminal is 1, where x may denote any one of {1, 2, 4, 8, 16, 32, 64, 128}, when the terminal needs to send the SRS on the SRS resource or the SRS resource set of serving cell 3, the transmission mechanism includes that: the terminal may disconnect the radio frequency chain of serving cell 1 and the radio frequency chain of serving cell 2 and hand over the radio frequency chain of serving cell 1 and the radio frequency chain of serving cell 2 to serving cell 3. That is, the terminal not only needs to hand over the radio frequency chain on the source cell to serving cell 3, but also needs to hand over the radio frequency chain on another serving cell (that is, serving cell 2 in this example, that is, the third serving cell) that supports PUSCH or PUCCH transmission and/or SRS transmission to serving cell 3. On this basis, the terminal cannot send the uplink transmission in serving cell 1 and serving cell 2. Accordingly, for serving cell 3, the serving node may receive the uplink signal by using the radio frequency chains handed over from serving cell 1 and serving cell 2 to serving cell 3 according to the transmission mechanism.

(3) The transmission mechanism includes that: regardless of the antenna configuration information of the terminal on serving cell 1 or the number of ports supported by the SRS resource or the SRS resource set on serving cell 1 configured by the serving node for the terminal and used for the codebook, the terminal disconnects the radio frequency chains applied to serving cell 1 and serving cell 2, so that each of the two radio frequency chains may be applied to the SRS sending of serving cell 3. Accordingly, for serving cell 3, the serving node may receive the uplink signal by using the radio frequency chains handed over from serving cell 1 and serving cell 2 to serving cell 3 according to the transmission mechanism.

In this example, for the transmission mechanism in which the terminal determines, according to the uplink configuration information of the third serving cell, whether the radio frequency chain applied to serving cell 2 needs to be disconnected and handed over to serving cell 3, the terminal may determine how to transmit the uplink signal on serving cell 3 through the system predefinition or the semi-static configuration of the serving node.

(1) The transmission mechanism includes that: the terminal determines whether to disconnect the radio frequency chain of serving cell 2 and hand over the radio frequency chain of serving cell 2 to serving cell 3 according to the antenna configuration information of serving cell 2 and/or the number of the ports supported by the SRS resource or the SRS resource set on serving cell 2 configured by the serving node for the terminal and used for the codebook. If the antenna configuration information of the terminal on serving cell 2 is 2T xR, and/or the number of the ports supported by the SRS resource or the SRS resource set on serving cell 2 used for the codebook and configured by the serving node for the terminal is greater than or equal to 2, where x may denote any one of {1, 2, 4, 8, 16, 32, 64, 128}, in the case where the terminal needs to send the SRS on the SRS resource or the SRS resource set of serving cell 3, the transmission mechanism includes that: the terminal disconnects the radio frequency chain of serving cell 1 and the radio frequency chain of serving cell 2 and hands over the radio frequency chain of serving cell 1 and the radio frequency chain of serving cell 2 to serving cell 3. That is, the terminal not only needs to hand over the radio frequency chain on the source cell to serving cell 3, but also needs to hand over the radio frequency chain on another serving cell (that is, serving cell 2 in this example, that is, the third serving cell) that supports PUSCH or PUCCH transmission and/or SRS transmission to serving cell 3. On this basis, the terminal cannot send the uplink transmission in serving cell 1 and serving cell 2. Accordingly, for serving cell 3, the serving node may receive the uplink signal by using the radio frequency chains handed over from serving cell 1 and serving cell 2 to serving cell 3 according to the transmission mechanism.

(2) The transmission mechanism includes that: the terminal determines, according to the antenna configuration information of serving cell 2, whether to hand over the uplink transmit resource of the third serving cell to the second serving cell. For example, whether to hand over the uplink transmit resource of the third serving cell to the second serving cell is determined according to the number of the ports supported by the SRS resource or the SRS resource set on serving cell 2 used for the codebook and configured by the serving node for the terminal. If the antenna capability of the terminal on serving cell 2 is 1T xR, and/or the number of the ports supported by the SRS resource or the SRS resource set on serving cell 2 used for the codebook and configured by the serving node for the terminal is 1, where x may denote any one of {1, 2, 4, 8, 16, 32, 64, 128}, when the terminal needs to send the SRS on the SRS resource or the SRS resource set of serving cell 3, the transmission mechanism includes that: the terminal may disconnect the radio frequency chain of serving cell 1 and hand over the radio frequency chain originally applied to the uplink transmission of serving cell 1 to serving cell 3 for sending the SRS on serving cell 3 and does not need to disconnect and hand over the radio frequency chain of serving cell 2 to serving cell 3. Accordingly, for serving cell 3, the serving node may receive the uplink signal by using the radio frequency chain handed over from serving cell 1 to serving cell 3 according to the transmission mechanism.

(3) The transmission mechanism includes that: regardless of the antenna configuration information of the terminal on serving cell 2 or the number of the ports supported by the SRS resource or the SRS resource set on serving cell 2 configured by the serving node for the terminal and used for the codebook, the terminal disconnects the radio frequency chains applied to serving cell 1 and serving cell 2, so that each of the two radio frequency chains may be applied to the SRS sending of serving cell 3. Accordingly, for serving cell 3, the serving node may receive the uplink signal by using the radio frequency chains handed over from serving cell 1 and serving cell 2 to serving cell 3 according to the transmission mechanism.

According to the method of the preceding embodiment, in the complex case of different uplink configuration information, the flexibility of uplink transmit resource allocation or uplink transmit resource handover is improved, the reliability of the uplink signal transmission is further improved, and it is ensured that the serving node can comprehensively receive the uplink signal and acquire the comprehensive downlink channel information.

In an embodiment, the method also includes operation 101. In operation 101, scheduling information of an uplink signal is transmitted. In the case where the terminal supports two uplink transmit resources and satisfies a set condition, the scheduling information includes DCI of format 0_0, DCI of format 0_1 for which the number of associated SRS ports is 1, or DCI of format 0_2 for which the number of associated SRS ports is 1.

In this embodiment, the terminal supports uplink transmission in multiple carriers. For example, the serving node configures the terminal to perform uplink transmission in at least serving cell 1 and serving cell 2. In the case where the capability of the terminal supports only two radio frequency chains, and the set condition is satisfied, PDCCH DCI used for the case where the serving node schedules the terminal on serving cell 1 and serving cell 2 to perform PUSCH or PUCCH or SRS or PRACH transmission is the DCI of format 0_0, the DCI of format 0_1 for which the number of associated SRS ports is 1 or the DCI of format 0_2 for which the number of associated SRS ports is 1.

In an embodiment, the set condition includes at least one of the following: the number of transmit antennas supported by the terminal in the first serving cell is greater than or equal to 2; or the two uplink transmit resources are allocated to the same serving cell.

In this embodiment, for example, the serving node configures the terminal to perform uplink transmission in at least serving cell 1 and serving cell 2. In this case, the terminal does not expect the serving node to use DCI of a non-fallback DCI format (such as DCI format 0_1 and DCI format 0_2) to schedule sending PUSCH or PUCCH or SRS or PRACH transmission on serving cell 2, and the terminal does not expect the serving node to use the PDCCH DCI to schedule sending the uplink transmission in which the number of the ports is greater than 1 on serving cell 2.

According to the method of the preceding embodiment, in the complex case of different uplink configuration information, flexibility of uplink scheduling is improved, the reliability of the uplink signal transmission is further improved, and it is ensured that the serving node can comprehensively receive the uplink signal and acquire the comprehensive downlink channel information.

In an embodiment, the transmission mechanism is predefined; or the transmission mechanism is semi-statically configured by the serving node.

In an embodiment, the uplink transmit resource includes at least one of the following: a radio frequency chain or a transmit antenna.

In an embodiment, the target resource includes at least one of the following: an SRS resource, an SRS resource set, an antenna port supported by the SRS resource or an antenna port supported by the SRS resource set.

In an embodiment, the SRS resource or the SRS resource set is used for antenna selection.

In this embodiment, the SRS resource or the SRS resource set is used for the antenna selection, so that the terminal may transmit an uplink signal in an antenna selection manner, and then the serving node may acquire comprehensive channel information. In some embodiments, the SRS resource or the SRS resource set may also not be used for the antenna selection. For example, the SRS resource or the SRS resource set used for a codebook may be used for determining whether the uplink transmit resource of the third serving cell needs to be handed over to the second serving cell.

In an embodiment, the uplink signal includes at least one of the following: an SRS, a PUSCH, a PUCCH or a PRACH.

According to the method of the preceding embodiment, in the complex case of different uplink configuration information, configuration of different types of uplink transmit resources, target resources and transmission mechanisms is considered, the reliability and flexibility of the uplink signal transmission are further improved, and it is ensured that the serving node can comprehensively receive the uplink signal and acquire the comprehensive downlink channel information.

Figure 6:
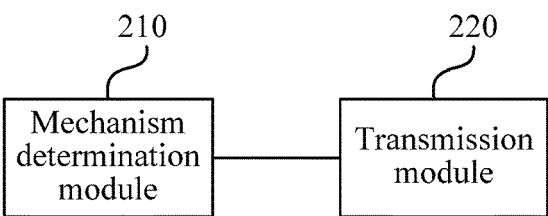
FIG. 6 is a schematic diagram illustrating the structure of an uplink signal transmission device according to an embodiment.

An embodiment of the present application provides an uplink signal transmission device. FIG. 6 is a schematic diagram illustrating the structure of an uplink signal transmission device according to an embodiment. As shown in FIG. 6, the uplink signal transmission device includes a mechanism determination module 210 and a transmission module 220.

The mechanism determination module 210 is configured to determine a transmission mechanism of an uplink signal according to uplink configuration information. The transmission module 220 is configured to transmit the uplink signal on a target resource according to the transmission mechanism.

In the uplink signal transmission device of this embodiment, the transmission mechanism of the uplink signal is determined according to the uplink configuration information; the uplink signal is transmitted on the configured target resource according to the transmission mechanism; and a terminal or a serving node may implement the sending and receiving of the uplink signal according to the transmission mechanism. In this manner, the reliability of the uplink signal transmission is improved. On this basis, the terminal may send uplink signals completely and comprehensively, and the serving node may acquire the downlink channel information completely. On this basis, the terminal may send uplink signals completely and comprehensively, and the serving node may acquire the downlink channel information completely.

In an embodiment, the uplink configuration information includes at least one of the following: antenna configuration information, uplink transmit resource allocation information, format information of DCI for scheduling uplink transmission, or information about the number of ports supported by an uplink resource used for a codebook.

In an embodiment, the uplink transmit resource allocation information includes at least one of the following: each serving cell is allocated one uplink transmit resource; a plurality of serving cells share one or more uplink transmit resources; or an uplink transmit resource is allocated to a serving cell having an uplink signal transmit demand in a set time period, and one or more serving cells having the uplink signal transmit demand exist.

In an embodiment, the serving cell includes at least one of the following: a cell supporting PUSCH transmission or PUCCH transmission, a cell supporting SRS transmission or a cell supporting PDSCH reception or PDCCH reception.

In an embodiment, the transmission mechanism includes that: for each serving cell allocated the uplink transmit resource, the terminal uses the allocated uplink transmit resource to transmit the uplink signal on the target resource according to the uplink configuration information. The uplink configuration information includes at least one of the following: antenna configuration information, format information of DCI for scheduling uplink transmission, or information about the number of ports supported by an uplink resource used for a codebook.

In an embodiment, for each serving cell allocated the uplink transmit resource, the terminal uses the allocated uplink transmit resource to transmit the uplink signal on the target resource in one of the following manners according to the uplink configuration information: for each serving cell allocated the uplink transmit resource, the terminal uses the same uplink transmit resource to transmit uplink signals on different target resources, where the uplink configuration information includes the antenna configuration information, and the antenna configuration information includes that the number of receive antennas supported by the terminal is greater than the number of transmit antennas supported by the terminal; for each serving cell allocated the uplink transmit resource, the terminal uses different uplink transmit resources to transmit the uplink signals on different target resources separately, where the uplink configuration information includes the antenna configuration information, and the antenna configuration information includes that the number of receive antennas supported by the terminal is greater than the number of transmit antennas supported by the terminal; for each serving cell allocated the uplink transmit resource, the terminal uses different uplink transmit resources to transmit the uplink signals on different target resources separately, where the uplink configuration information includes the antenna configuration information, and the antenna configuration information includes that the number of receive antennas supported by the terminal is less than or equal to the number of transmit antennas supported by the terminal; for each serving cell allocated the uplink transmit resource, the terminal uses the same uplink transmit resource to transmit the uplink signals on different target resources, where the uplink configuration information includes the format information of the DCI for scheduling the uplink transmission in the serving cell, and the format information of the DCI for scheduling the uplink transmission in the serving cell includes that the format of the DCI is format 0_0; for each serving cell allocated the uplink transmit resource, the terminal uses different uplink transmit resources to transmit the uplink signals on different target resources separately, where the uplink configuration information includes the format information of the DCI for scheduling the uplink transmission in the serving cell, and the format information of the DCI for scheduling the uplink transmission in the serving cell includes that the format of the DCI is the format other than format 0_0; for each serving cell allocated the uplink transmit resource, the terminal uses the same uplink transmit resource to transmit the uplink signals on different target resources, where the uplink configuration information includes the information about the number of the ports supported by the uplink resource configured on the serving cell and used for the codebook, and the information about the number of the ports supported by the uplink resource configured on the serving cell and used for the codebook includes that the number of ports is 1; or for each serving cell allocated the uplink transmit resource, the terminal uses different uplink transmit resources to transmit the uplink signals on different target resources separately, where the uplink configuration information includes the information about the number of the ports supported by the uplink resource configured on the serving cell and used for the codebook, and the information about the number of the ports supported by the uplink resource configured on the serving cell and used for the codebook includes that the number of ports is greater than or equal to 2.

In an embodiment, the set time period includes one time unit or a plurality of consecutive time units. The time unit includes at least one of the following: a frame, a subframe, a slot, a mini-slot or an orthogonal frequency-division multiplexing (OFDM) symbol.

In an embodiment, the transmission mechanism includes that: the terminal releases all or part of the uplink transmit resources allocated to the first serving cell, and the released uplink transmit resources are configured for transmission of the uplink signal in the second serving cell.

In an embodiment, the first serving cell includes at least one of the following: a source cell of the second serving cell, where the source cell of the second serving cell is configured by the serving node; a cell other than the source cell of the second serving cell; a cell sharing an uplink transmit resource with the source cell of the second serving cell; a cell having a transmit demand in the set time period; or a cell configured with a target resource for transmission of the uplink signal.

In an embodiment, the second serving cell includes at least one of the following: a target cell configured with a source cell; a cell configured with a target resource for transmission of an uplink signal; a serving cell not supporting PUSCH transmission or PUCCH transmission; a cell in which antenna configuration information satisfies the first condition, where the first condition includes that the number of transmit antennas supported by the terminal in the second serving cell is greater than or equal to 2; a cell in which antenna configuration information satisfies the second condition, where the second condition includes that the number of transmit antennas supported by the terminal in the second serving cell is 1; a cell in which the format of the DCI for scheduling the uplink transmission is the first format, where the first format includes format 0_0; a cell in which the format of the DCI for scheduling the uplink transmission is the second format, where the second format includes the format other than format 0_0; a cell in which the number of ports supported by the uplink resource used for the codebook is the first number, where the first number is 1; or a cell in which the number of ports supported by the uplink resource used for the codebook is the second number, where the second number is greater than or equal to 2.

In an embodiment, the format of the DCI for scheduling the uplink transmission in the second serving cell is the first format. The first format includes format 0_0. The format of the DCI for scheduling the uplink transmission in the second serving cell is the second format. The second format includes the format other than format 0_0. The number of ports supported by the uplink resource configured on the second serving cell and used for the codebook is the first number. The first number is 1. The number of ports supported by the uplink resource configured on the second serving cell and used for the codebook is the second number. The second number is greater than or equal to 2.

In an embodiment, the transmission mechanism includes that: in the uplink transmit resources of the first serving cell, the uplink transmit resource not released by the terminal is configured for transmission of the uplink signal in the first serving cell; or the terminal hands over part of the uplink resources of the first serving cell to the third serving cell, and the part of the uplink resources are configured for transmission of the uplink signal in the third serving cell.

In an embodiment, the transmission mechanism includes at least one of the following: the terminal hands over the uplink transmit resource of the third serving cell to the second serving cell; the terminal determines, according to uplink configuration information of the first serving cell, whether to hand over the uplink transmit resource of the third serving cell to the second serving cell; the terminal determines, according to uplink configuration information of the second serving cell, whether to hand over the uplink transmit resource of the third serving cell to the second serving cell; or the terminal determines, according to uplink configuration information of the third serving cell, whether to hand over the uplink transmit resource of the third serving cell to the second serving cell.

In an embodiment, the terminal determines, according to the uplink configuration information of the second serving cell, whether to hand over the uplink transmit resource of the third serving cell to the second serving cell in at least one of the following manners: the uplink configuration information includes the antenna configuration information, and in the case where the number of transmit antennas supported in the antenna configuration information is greater than or equal to 2, the terminal hands over the uplink transmit resource of the third serving cell to the second serving cell; the uplink configuration information includes the antenna configuration information, and in the case where the number of transmit antennas supported in the antenna configuration information is 1, the uplink transmit resource of the third serving cell is not handed over to the second serving cell; the uplink configuration information includes the format information of the DCI for scheduling the uplink transmission, and in the case where the format of the DCI for scheduling the second serving cell is the format other than format 0_0, the terminal hands over the uplink transmit resource of the third serving cell to the second serving cell; the uplink configuration information includes the format information of the DCI for scheduling the uplink transmission, and in the case where the format of the DCI for scheduling the second serving cell is format 0_0, the uplink transmit resource of the third serving cell is not handed over to the second serving cell; the uplink configuration information includes the information about the number of ports supported by the uplink resource used for the codebook, and in the case where the number of ports supported by the uplink resource used for the codebook is greater than or equal to 2, the terminal hands over the uplink transmit resource of the third serving cell to the second serving cell; or the uplink configuration information includes the information about the number of ports supported by the uplink resource used for the codebook, and in the case where the number of ports supported by the uplink resource used for the codebook is equal to 1, the uplink transmit resource of the third serving cell is not handed over to the second serving cell.

In an embodiment, the terminal determines, according to the uplink configuration information of the first serving cell, whether to hand over the uplink transmit resource of the third serving cell to the second serving cell in at least one of the following manners: the uplink configuration information is the antenna configuration information, and in the case where the number of transmit antennas supported in the antenna configuration information is equal to 1, the terminal hands over the uplink transmit resource of the third serving cell to the second serving cell; the uplink configuration information is the antenna configuration information, and in the case where the number of transmit antennas supported in the antenna configuration information is greater than or equal to 2, the uplink transmit resource of the third serving cell is not handed over to the second serving cell; the uplink configuration information is the format information of the DCI for scheduling the uplink transmission, and in the case where the format of the DCI for scheduling the first serving cell is format 0_0, the terminal hands over the uplink transmit resource of the third serving cell to the second serving cell; the uplink configuration information is the format information of the DCI for scheduling the uplink transmission, and in the case where the format of the DCI for scheduling the second serving cell is the format other than format 0_0, the uplink transmit resource of the third serving cell is not handed over to the second serving cell; the uplink configuration information is the information about the number of ports supported by the uplink resource used for the codebook, and in the case where the number of ports supported by the uplink resource used for the codebook is equal to 1, the terminal hands over the uplink transmit resource of the third serving cell to the second serving cell; or the uplink configuration information is the information about the number of ports supported by the uplink resource used for the codebook, and in the case where the number of ports supported by the uplink resource used for the codebook is greater than or equal to 2, the uplink transmit resource of the third serving cell is not handed over to the second serving cell.

In an embodiment, the terminal determines, according to the uplink configuration information of the third serving cell, whether to hand over the uplink transmit resource of the third serving cell to the second serving cell in at least one of the following manners: the uplink configuration information is the antenna configuration information, and in the case where the number of transmit antennas supported in the antenna configuration information is greater than or equal to 2, the terminal hands over the uplink transmit resource of the third serving cell to the second serving cell; the uplink configuration information is the antenna configuration information, and in the case where the number of transmit antennas supported in the antenna configuration information is equal to 1, the uplink transmit resource of the third serving cell is not handed over to the second serving cell; the uplink configuration information is the format information of the DCI for scheduling the uplink transmission, and in the case where the format of the DCI for scheduling the third serving cell is the format other than format 0_0, the terminal hands over the uplink transmit resource of the third serving cell to the second serving cell; the uplink configuration information is the format information of the DCI for scheduling the uplink transmission, and in the case where the format of the DCI for scheduling the third serving cell is format 0_0, the uplink transmit resource of the third serving cell is not handed over to the second serving cell; the uplink configuration information is the information about the number of ports supported by the uplink resource used for the codebook, and in the case where the number of ports supported by the uplink resource used for the codebook is greater than or equal to 2, the terminal hands over the uplink transmit resource of the third serving cell to the second serving cell; or the uplink configuration information is the information about the number of ports supported by the uplink resource used for the codebook, and in the case where the number of ports supported by the uplink resource used for the codebook is equal to 1, the uplink transmit resource of the third serving cell is not handed over to the second serving cell.

In an embodiment, the device further includes a scheduling information transmission module configured to transmit scheduling information of an uplink signal. In the case where the terminal supports two uplink transmit resources and satisfies the set condition, the scheduling information includes DCI of format 0_0, DCI of format 0_1 for which the number of associated SRS ports is 1, or DCI of format 0_2 for which the number of associated SRS ports is 1.

In an embodiment, the set condition includes at least one of the following: the number of transmit antennas supported by the terminal in the first serving cell is greater than or equal to 2; or the two uplink transmit resources are allocated to the same serving cell.

In an embodiment, the transmission mechanism is predefined; or the transmission mechanism is semi-statically configured by the serving node.

In an embodiment, the uplink transmit resource includes at least one of the following: a radio frequency chain or a transmit antenna.

In an embodiment, the target resource includes at least one of the following: an SRS resource, an SRS resource set, an antenna port supported by the SRS resource or an antenna port supported by the SRS resource set. The SRS resource or the SRS resource set is used for antenna selection.

In an embodiment, the uplink signal includes at least one of the following: an SRS, a PUSCH, a PUCCH or a PRACH.

The uplink signal transmission device provided in this embodiment and the uplink signal transmission method provided in the preceding embodiments belong to the same concept. For technical details not described in detail in this embodiment, reference may be made to any one of the preceding embodiments.

An embodiment of the present application provides a communication node. The uplink signal transmission method may be performed by the uplink signal transmission method which may be implemented by software and/or hardware and integrated in the communication node. The communication node may be a terminal, for example, a user equipment (UE). The terminal may send an uplink signal to a serving node according to a transmission mechanism. Alternatively, the communication node may be a serving node, for example, a base station. The serving node may receive an uplink signal on a corresponding target resource according to a transmission mechanism. Thus, comprehensive downlink channel information is obtained.

Figure 7:
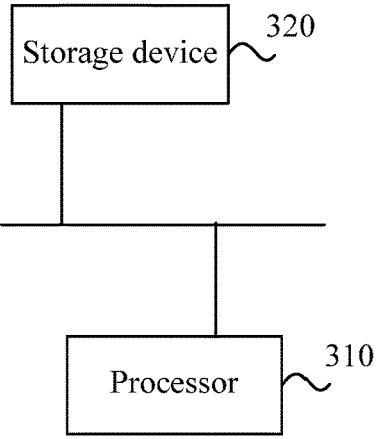
FIG. 7 is a schematic diagram illustrating the hardware structure of a communication node according to an embodiment.

FIG. 7 is a schematic diagram illustrating the hardware structure of a communication node according to an embodiment. As shown in FIG. 7, the communication node provided in this embodiment includes a processor 310 and a storage device 320. The communication node may include one or more processors. One processor 310 is shown as an example in FIG. 7. The processor 310 and the storage device 320 in the equipment may be connected via a bus or in other manners. The connection via the bus is shown as an example in FIG. 7.

One or more programs, when executed by the one or more processors 310, causes the one or more processors 310 perform the uplink signal transmission method in any one of the preceding embodiments.

The storage device 320 in the communication node, as a computer-readable storage medium, may be configured to store one or more programs which may be a software program, a computer-executable program and module, such as program instructions/modules (for example, modules in the uplink signal transmission device, which includes a mechanism determination module 210 and a transmission module 220, as shown in FIG. 6) corresponding to the uplink signal transmission method in embodiments of the present application. The processor 310 executes software programs, instructions, and modules stored in the storage device 320 to perform various function applications and data processing of the communication node, that is, to implement the uplink signal transmission method in the preceding method embodiments.

The storage device 320 mainly includes a program storage region and a data storage region. The program storage region may store an operating system and an application program required by at least one function. The data storage region may store data (such as uplink configuration information and transmission mechanisms in the preceding embodiments) created based on use of the equipment. The storage device 320 may include a high-speed random-access memory and may also include a non-volatile memory such as at least one disk memory, a flash memory device or another non-volatile solid-state memory. In some examples, the storage device 320 may further include memories which are remotely disposed with respect to the processor 310. These remote memories may be connected to the communication node via a network. Examples of the preceding network include, but are not limited to, the Internet, an intranet, a network, a communication network and a combination thereof.

The one or more programs included in the communication node, when executed by the one or more processors 310, implement the following operations: a transmission mechanism of an uplink signal is determined according to uplink configuration information; and the uplink signal is transmitted on a target resource according to the transmission mechanism.

The communication node provided in this embodiment and the uplink signal transmission method provided in the preceding embodiments belong to the same concept. For technical details not described in detail in this embodiment, reference may be made to any one of the preceding embodiments.

An embodiment of the present application provides a storage medium including computer-executable instructions, and the computer-executable instructions are used for executing an uplink signal transmission method when executed by a computer processor. The method includes determining a transmission mechanism of an uplink signal according to uplink configuration information and transmitting the uplink signal on a target resource according to the transmission mechanism.

From the preceding description of embodiments, it is to be understood by those skilled in the art that the present application may be implemented by software and general-purpose hardware or may be implemented by hardware. Based on this understanding, the technical solutions of the present application may be embodied in the form of a software product. The software product in a computer may be stored in a computer-readable storage medium such as a floppy disk, read-only memory (ROM), random-access memory (RAM), flash memory, hard disk or optical disk in the computer and includes multiple instructions for enabling a computer device (which may be a personal computer, a server or a network device) to perform the method in any embodiment of the present application.

The preceding are only exemplary embodiments of the present application and are not intended to limit the scope of the present application.

A block diagram of any logic flow among the drawings of the present application may represent program steps, may represent interconnected logic circuits, modules and functions, or may represent a combination of program steps with logic circuits, modules and functions. Computer programs may be stored in a memory. The memory may be in any type suitable for the local technical environment and may be implemented using any suitable data storage technology, for example, but not limited to, a read-only memory (ROM), a random-access memory (RAM) and an optical memory apparatus and system (a digital video disc (DVD) or a compact disc (CD)). Computer-readable media may include a non-transitory storage medium. The data processor may be of any type suitable to the local technical environment, such as, but is not limited to, a general-purpose computer, a special-purpose computer, a microprocessor, a digital signal processor (DSP), an application specific integrated circuit (ASIC), a field-programmable gate array (FPGA) and a processor based on a multi-core processor architecture.

What is claimed is:

1. An uplink signal transmission method, comprising:
determining a transmission mechanism of an uplink signal according to uplink configuration information;
transmitting the uplink signal on a target resource according to the transmission mechanism;
wherein the uplink configuration information comprises uplink transmit resource allocation information;
wherein the uplink transmit resource allocation information comprises at least one of the following:
a plurality of serving cells share at least one uplink transmit resource; or
an uplink transmit resource is allocated to a serving cell having an uplink signal transmit demand in a set time period, and at least one serving cell having the uplink signal transmit demand exists.

2. The method according to claim 1, wherein the uplink configuration information further comprises at least one of the following: antenna configuration information, format information of downlink control information (DCI) for scheduling uplink transmission, or information about a number of ports supported by an uplink resource used for a codebook.

3. The method according to claim 2, wherein the uplink transmit resource allocation information further comprises:
each serving cell of a plurality of serving cells is allocated one uplink transmit resource.

4. The method according to claim 3, wherein the plurality of serving cells comprise at least one of the following:
a cell supporting physical uplink shared channel (PUSCH) transmission or physical uplink control channel (PUCCH) transmission;
a cell supporting sounding reference signal (SRS) transmission; or
a cell supporting physical downlink shared channel (PDSCH) reception or physical downlink control channel (PDCCH) reception.

5. The method according to claim 1, wherein the transmission mechanism comprises:
for each serving cell allocated an uplink transmit resource among a plurality of serving cells allocated uplink transmit resources, transmitting, by a terminal, the uplink signal on the target resource by using the allocated uplink transmit resource according to the uplink configuration information;
wherein the uplink configuration information comprises at least one of the following: antenna configuration information, format information of DCI for scheduling uplink transmission, or information about a number of ports supported by an uplink resource used for a codebook.

6. The method according to claim 5, wherein for each serving cell allocated the uplink transmit resource, transmitting, by the terminal, the uplink signal on the target resource by using the allocated uplink transmit resource according to the uplink configuration information comprises at least one of the following:

for each serving cell allocated the uplink transmit resource, transmitting, by the terminal, uplink signals on different target resources by using a same uplink transmit resource according to the uplink configuration information, wherein the uplink configuration information comprises the antenna configuration information, wherein the antenna configuration information comprises that a number of receive antennas supported by the terminal is greater than a number of transmit antennas supported by the terminal;

for each serving cell allocated the uplink transmit resource, transmitting, by the terminal, uplink signals on different target resources by using different uplink transmit resources separately according to the uplink configuration information, wherein the uplink configuration information comprises the antenna configuration information, wherein the antenna configuration information comprises that a number of receive antennas supported by the terminal is greater than a number of transmit antennas supported by the terminal;

for each serving cell allocated the uplink transmit resource, transmitting, by the terminal, uplink signals on different target resources by using different uplink transmit resources separately according to the uplink configuration information, wherein the uplink configuration information comprises the antenna configuration information, wherein the antenna configuration information comprises that a number of receive antennas supported by the terminal is less than or equal to a number of transmit antennas supported by the terminal;

for each serving cell allocated the uplink transmit resource, transmitting, by the terminal, uplink signals on different target resources by using a same uplink transmit resource according to the uplink configuration information, wherein the uplink configuration information comprises format information of DCI for scheduling uplink transmission in each serving cell allocated the uplink transmit resource, wherein the format information of the DCI for scheduling the uplink transmission in each serving cell allocated the uplink transmit resource comprises that a format of the DCI is format 0_0;

for each serving cell allocated the uplink transmit resource, transmitting, by the terminal, uplink signals on different target resources by using different uplink transmit resources separately according to the uplink configuration information, wherein the uplink configuration information comprises format information of DCI for scheduling uplink transmission in each serving cell allocated the uplink transmit resource, wherein the format information of the DCI for scheduling the uplink transmission in each serving cell allocated the uplink transmit resource comprises that a format of the DCI is a format other than format 0_0;

for each serving cell allocated the uplink transmit resource, transmitting, by the terminal, uplink signals on different target resources by using a same uplink transmit resource according to the uplink configuration information, wherein the uplink configuration information comprises information about a number of ports supported by an uplink resource that is used for a codebook and configured on each serving cell, wherein the information about the number of the ports supported by the uplink resource that is used for the codebook and configured on each serving cell comprises that the number of the ports is 1; or for each serving cell allocated the uplink transmit resource, transmitting, by the terminal, uplink signals on different target resources by using different uplink transmit resources separately according to the uplink configuration information, wherein the uplink configuration information comprises information about a number of ports supported by an uplink resource that is used for a codebook and configured on each serving cell allocated the uplink transmit resource, wherein the information about the number of the ports supported by the uplink resource that is used for the codebook and configured on each serving cell allocated the uplink transmit resource comprises that the number of the ports is greater than or equal to 2.

7. The method according to claim 3, wherein the set time period comprises one time unit or a plurality of consecutive time units, wherein the one time unit or a time unit of the plurality of consecutive time units comprises at least one of the following: a frame, a subframe, a slot, a mini-slot or an orthogonal frequency-division multiplexing (OFDM) symbol.

8. The method according to claim 1, wherein the transmission mechanism comprises:

releasing, by a terminal, all or part of uplink transmit resources allocated to a first serving cell, wherein the released all or part of the uplink transmit resources are configured for transmission of an uplink signal in a second serving cell.

9. The method according to claim 8, wherein the first serving cell comprises at least one of the following:

a source cell of the second serving cell, wherein the source cell of the second serving cell is configured by a serving node;

a cell other than a source cell of the second serving cell;

a cell sharing an uplink transmit resource with a source cell of the second serving cell;

a cell having a transmit demand in a set time period; or a cell configured with the target resource for transmission of the uplink signal; and wherein the second serving cell comprises at least one of the following:

a target cell configured with a source cell;

a cell configured with the target resource for transmission of the uplink signal;

a serving cell not supporting PUSCH transmission or PUCCH transmission;

a cell in which antenna configuration information satisfies a first condition, wherein the first condition comprises that a number of transmit antennas supported by the terminal in the cell is greater than or equal to 2;

a cell in which antenna configuration information satisfies a second condition, wherein the second condition comprises that a number of transmit antennas supported by the terminal in the cell is 1;

a cell in which a format of DCI for scheduling uplink transmission is a first format, wherein the first format comprises format 0_0;

a cell in which a format of DCI for scheduling uplink transmission is a second format, wherein the second format comprises a format other than format 0_0;

a cell in which a number of ports supported by an uplink resource used for a codebook is a first number, wherein the first number is 1; or a cell in which a number of ports supported by an uplink resource used for a codebook is a second number, wherein the second number is greater than or equal to 2.

10. The method according to claim 8, wherein among the uplink transmit resources of the first serving cell, an uplink transmit resource not released by the terminal is configured for transmission of an uplink signal in the first serving cell; or part of uplink resources of the first serving cell are handed over to a third serving cell and configured for transmission of an uplink signal in the third serving cell.

11. The method according to claim 1, wherein the transmission mechanism comprises at least one of the following:

handing over, by a terminal, an uplink transmit resource of a third serving cell to a second serving cell;

determining, by a terminal according to uplink configuration information of a first serving cell, whether to hand over an uplink transmit resource of a third serving cell to a second serving cell;

determining, by a terminal according to uplink configuration information of a second serving cell, whether to hand over an uplink transmit resource of a third serving cell to the second serving cell; or determining, by a terminal according to uplink configuration information of a third serving cell, whether to hand over an uplink transmit resource of the third serving cell to a second serving cell.

12. The method according to claim 11, wherein determining, by the terminal according to the uplink configuration information of the second serving cell, whether to hand over the uplink transmit resource of the third serving cell to the second serving cell comprises at least one of the following:

in a case where the uplink configuration information of the second serving cell comprises antenna configuration information, and a number of transmit antennas supported in the antenna configuration information is greater than or equal to 2, handing over, by the terminal, the uplink transmit resource of the third serving cell to the second serving cell;

in a case where the uplink configuration information of the second serving cell comprises antenna configuration information, and a number of transmit antennas supported in the antenna configuration information is 1, not handing over the uplink transmit resource of the third serving cell to the second serving cell;

in a case where the uplink configuration information of the second serving cell comprises format information of DCI for scheduling uplink transmission, and a format of the DCI for scheduling the uplink transmission in the second serving cell is a format other than format 0_0, handing over, by the terminal, the uplink transmit resource of the third serving cell to the second serving cell;

in a case where the uplink configuration information of the second serving cell comprises format information of DCI for scheduling uplink transmission, and a format of the DCI for scheduling the uplink transmission in the second serving cell is format 0_0, not handing over the uplink transmit resource of the third serving cell to the second serving cell;

in a case where the uplink configuration information of the second serving cell comprises information about a number of ports supported by an uplink resource used for a codebook, and the number of the ports supported by the uplink resource used for the codebook is greater than or equal to 2, handing over, by the terminal, the uplink transmit resource of the third serving cell to the second serving cell; or in a case where the uplink configuration information of the second serving cell comprises information about a number of ports supported by an uplink resource used for a codebook, and the number of the ports supported by the uplink resource used for the codebook is equal to 1, not handing over the uplink transmit resource of the third serving cell to the second serving cell.

13. The method according to claim 11, wherein determining, by the terminal according to the uplink configuration information of the first serving cell, whether to hand over the uplink transmit resource of the third serving cell to the second serving cell comprises at least one of the following:

in a case where the uplink configuration information of the first serving cell comprises antenna configuration information, and a number of transmit antennas supported in the antenna configuration information is equal to 1, handing over, by the terminal, the uplink transmit resource of the third serving cell to the second serving cell;

in a case where the uplink configuration information of the first serving cell comprises antenna configuration information, and a number of transmit antennas supported in the antenna configuration information is greater than or equal to 2, not handing over the uplink transmit resource of the third serving cell to the second serving cell;

in a case where the uplink configuration information of the first serving cell comprises format information of DCI for scheduling uplink transmission, and a format of the DCI for scheduling the uplink transmission in the first serving cell is format 0_0, handing over, by the terminal, the uplink transmit resource of the third serving cell to the second serving cell;

in a case where the uplink configuration information of the first serving cell comprises format information of DCI for scheduling uplink transmission, and a format of the DCI for scheduling the uplink transmission in the first serving cell is a format other than format 0_0, not handing over the uplink transmit resource of the third serving cell to the second serving cell;

in a case where the uplink configuration information of the first serving cell comprises information about a number of ports supported by an uplink resource used for a codebook, and the number of the ports supported by the uplink resource used for the codebook is equal to 1, handing over, by the terminal, the uplink transmit resource of the third serving cell to the second serving cell; or in a case where the uplink configuration information of the first serving cell comprises information about a number of ports supported by an uplink resource used for a codebook, and the number of the ports supported by the uplink resource used for the codebook is greater than or equal to 2, not handing over the uplink transmit resource of the third serving cell to the second serving cell.

14. The method according to claim 11, wherein determining, by the terminal according to the uplink configuration information of the third serving cell, whether to hand over the uplink transmit resource of the third serving cell to the second serving cell comprises at least one of the following:

in a case where the uplink configuration information of the third serving cell comprises antenna configuration information, and a number of transmit antennas supported in the antenna configuration information is greater than or equal to 2, handing over, by the terminal, the uplink transmit resource of the third serving cell to the second serving cell;

in a case where the uplink configuration information of the third serving cell comprises antenna configuration information, and a number of transmit antennas supported in the antenna configuration information is equal to 1, not handing over the uplink transmit resource of the third serving cell to the second serving cell;

in a case where the uplink configuration information of the third serving cell comprises format information of DCI for scheduling uplink transmission, and a format of the DCI for scheduling the uplink transmission in the third serving cell is a format other than format 0_0, handing over, by the terminal, the uplink transmit resource of the third serving cell to the second serving cell;

in a case where the uplink configuration information of the third serving cell comprises format information of DCI for scheduling uplink transmission, and a format of the DCI for scheduling the uplink transmission in the third serving cell is format 0_0, not handing over the uplink transmit resource of the third serving cell to the second serving cell;

in a case where the uplink configuration information of the third serving cell comprises information about a number of ports supported by an uplink resource used for a codebook, and the number of the ports supported by the uplink resource used for the codebook is greater than or equal to 2, handing over, by the terminal, the uplink transmit resource of the third serving cell to the second serving cell; or in a case where the uplink configuration information of the third serving cell comprises information about a number of ports supported by an uplink resource used for a codebook, and the number of the ports supported by the uplink resource used for the codebook is equal to 1, not handing over the uplink transmit resource of the third serving cell to the second serving cell.

15. The method according to claim 1, further comprising: transmitting scheduling information of the uplink signal, wherein in a case where a terminal supports two uplink transmit resources and satisfies a set condition, the scheduling information comprises DCI of format 0_0, DCI of format 0_1 for which a number of associated SRS ports is 1, or DCI of format 0_2 for which a number of associated SRS ports is 1; and wherein the set condition comprises at least one of the following: a number of transmit antennas supported by the terminal in a first serving cell is greater than or equal to 2; or the two uplink transmit resources are allocated to a same serving cell.

16. The method according to claim 1, wherein the transmission mechanism is predefined; or the transmission mechanism is semi-statically configured by a serving node.

17. The method according to claim 5, wherein the uplink transmit resource comprises at least one of the following: a radio frequency chain or a transmit antenna.

18. The method according to claim 1, wherein the target resource comprises at least one of the following: an SRS resource, an SRS resource set, an antenna port supported by an SRS resource, or an antenna port supported by an SRS resource set; and wherein the SRS resource or the SRS resource set is used for antenna selection.

19. The method according to claim 1, wherein the uplink signal comprises at least one of the following: an SRS, a PUSCH, a PUCCH or a physical random access channel (PRACH).

20. A communication node, comprising:

at least one processor; and a storage device configured to store at least one program, wherein the at least one program, when executed by the at least one processor, causes the at least one processor to perform:

determining a transmission mechanism of an uplink signal according to uplink configuration information;

transmitting the uplink signal on a target resource according to the transmission mechanism;

wherein the uplink configuration information comprises uplink transmit resource allocation information;

wherein the uplink transmit resource allocation information comprises at least one of the following:

a plurality of serving cells share at least one uplink transmit resource; or an uplink transmit resource is allocated to a serving cell having an uplink signal transmit demand in a set time period, and at least one serving cell having the uplink signal transmit demand exists.

* * * * *